United States Patent
Le Taillandier De Gabory et al.

(10) Patent No.: US 8,989,599 B2
(45) Date of Patent: Mar. 24, 2015

(54) OPTICAL COMMUNICATION SYSTEM WITH MONITOR FUNCTIONS AND MONITORING METHOD THEREFOR

(75) Inventors: Emmanuel Le Taillandier De Gabory, Tokyo (JP); Kiyoshi Fukuchi, Tokyo (JP); Manabu Arikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 34 days.

(21) Appl. No.: 14/001,226

(22) PCT Filed: Feb. 28, 2011

(86) PCT No.: PCT/JP2011/055159
§ 371 (c)(1),
(2), (4) Date: Aug. 23, 2013

(87) PCT Pub. No.: WO2012/117565
PCT Pub. Date: Sep. 7, 2012

(65) Prior Publication Data
US 2013/0336647 A1 Dec. 19, 2013

(51) Int. Cl.
H04B 10/12 (2006.01)
H04B 10/06 (2006.01)
H04B 10/07 (2013.01)
H04B 10/077 (2013.01)

(52) U.S. Cl.
CPC ............ *H04B 10/07* (2013.01); *H04B 10/0775* (2013.01)
USPC .............................. 398/182; 398/208; 398/25

(58) Field of Classification Search
CPC .......................... H04B 10/07; H04B 10/0775
See application file for complete search history.

(56) References Cited

U.S. PATENT DOCUMENTS

| | | | |
|---|---|---|---|
| 5,438,303 A * | 8/1995 | Murakami et al. | 332/109 |
| 7,817,924 B2 * | 10/2010 | Gervais et al. | 398/188 |
| 8,116,635 B2 * | 2/2012 | Tanimura et al. | 398/184 |
| 8,249,463 B2 * | 8/2012 | Perkins | 398/152 |

(Continued)

FOREIGN PATENT DOCUMENTS

| | | |
|---|---|---|
| JP | 11-341102 A | 12/1999 |
| JP | 2003-218844 A | 7/2003 |

(Continued)

OTHER PUBLICATIONS

S. J. Savory et al., "Ultra Long-Haul QPSK Transmission using Digital Coherent Receiver", Proc. 2007 IEEE/LEOS Summer Topical Meeting., 2007, pp. 13-14.

(Continued)

*Primary Examiner* — Ken Vanderpuye
*Assistant Examiner* — Amritbir Sandhu
(74) *Attorney, Agent, or Firm* — Sughrue Mion, PLLC

(57) ABSTRACT

Since it is difficult to fast, simply monitor impairments of received signals with higher receiver sensitivity, a monitoring method for an optical communication system according to an exemplary aspect of the invention includes the steps of emitting lightwave signals to be modulated according to a data, forming dips at transitions between temporally consecutive groups of n symbols of the lightwave signals, wherein the dips are formed at each of (n−1) first transitions of the group, no dip is formed at the n-th transition on the lightwave signals, receiving the lightwave signals, extracting frequency components characterized by the numerical value n from received lightwave signals, and monitoring the received lightwave signals by using the frequency components.

10 Claims, 19 Drawing Sheets

(56) References Cited

U.S. PATENT DOCUMENTS

| | | | |
|---|---|---|---|
| 8,675,798 B1* | 3/2014 | Argyres | 375/359 |
| 2002/0176129 A1 | 11/2002 | Dinu et al. | |
| 2009/0297165 A1* | 12/2009 | Nakamoto | 398/155 |
| 2010/0215374 A1* | 8/2010 | Liu et al. | 398/98 |
| 2012/0020660 A1* | 1/2012 | Le Taillandier De Gabory et al. | 398/25 |
| 2012/0177372 A1* | 7/2012 | Liu et al. | 398/65 |
| 2012/0201546 A1* | 8/2012 | Mizuochi et al. | 398/147 |
| 2012/0281981 A1* | 11/2012 | Le Taillandier De Gabory et al. | 398/29 |
| 2013/0022351 A1* | 1/2013 | Arikawa | 398/25 |
| 2013/0051801 A1* | 2/2013 | Kuschnerov et al. | 398/65 |
| 2013/0064557 A1* | 3/2013 | Hu et al. | 398/186 |
| 2013/0336647 A1* | 12/2013 | Le Taillandier De Gabory et al. | 398/25 |
| 2014/0079386 A1* | 3/2014 | Yasuda et al. | 398/16 |

FOREIGN PATENT DOCUMENTS

| | | |
|---|---|---|
| JP | 2008-219166 A | 9/2008 |
| JP | 2010-130574 A | 6/2010 |
| WO | 2010/119576 A1 | 10/2010 |

OTHER PUBLICATIONS

Masahito Tomizawa, et al., "Terabit LAN with Optical Virtual Concatenation for Grid Applications with Super-Computers", Optical Fiber Communication Conference (OFC) 2005 OThG6, 3 pages.

Makoto Murakami, et al., "A Remote Supervisory System Based on Subcarrier Over Modulation for Submarine Optical Amplifier Systems", Journal of Lightwave Technology, May 1996, pp. 671-677, vol. 14, No. 5.

M.N. Peterson, et al., "Online Chromatic Dispersion Monitoring and Compensation Using a Single Inband Subcarrier Tone", IEEE Photonics Technology Letters, Apr. 2002, pp. 570-572, vol. 14, No. 4.

O.H. Adamczyk, et. al., "Coarse and Fine Bit Symchronization for WDM Interconnections Using Two Subcarrier-Multiplexed Control Pilot Tones", IEEE Photonics Technology Letters, Aug. 1999, pp. 1057-1059, vol. 11, No. 8.

Emmanuel Le Taillandier De Gabory, et al. "Pseudo-Return-to-Zero Modulation Scheme: Application to the Compensation of Intra-Polarization Skew for PolMux Signals", ECOC, Sep. 20-24, 2009 Paper 3.4.4., pp. 1-2.

* cited by examiner

FIG. 14

| | Carver | Index | Q [dB] |
|---|---|---|---|
| The embodiments | FIG.1 | 4 | 10.9 |
| | | 16 | 11.8 |
| | FIG.2 | 4 | 10.6 |
| | | 16 | 10.7 |
| | FIG.3 | 4 | 11.0 |
| | | 16 | 11.6 |
| Related Arts | PRZ(4) | | 9.9 |
| | PRZ(16) | | 9.8 |
| | NRZ | | 9.9 |
| Reference | RZ | | 11.9 |

OPTICAL COMMUNICATION SYSTEM WITH MONITOR FUNCTIONS AND MONITORING METHOD THEREFOR

CROSS REFERENCE TO RELATED APPLICATIONS

This application is a National Stage of International Application No. PCT/JP2011/055159 filed Feb. 28, 2011, the contents of which are incorporated herein by reference in their entirety.

TECHNICAL FIELD

The present invention relates generally to optical communications systems, in particular, to an optical communication system with monitor functions.

BACKGROUND ART

Increasing the capacity of optical communications systems is required in order to satisfy the increasing demand for data traffic and to reduce the cost of data transmission. Among the ways to achieve this, serial to parallel conversion and the increase of the symbol rate are widely used.

Serial to parallel conversion enables to split a serial high bit rate channel into lower bit rate channels. The lower bit rate channels are transmitted as parallel channels between the same start point and the same stop point of the transmission, and the parallel channels do not have any crosstalk, ideally. After reception, the parallel channels are serialized into a higher bit rate channel, which contains the transmitted information of the original serial channel. This enables to decrease the effect of the distortions and impairments appearing during the transmission because the effects increase with the symbol rate. It also enables to use more transmission channels to transmit a huge amount of data, which could not be transmitted on a single channel, and enables to handle them logically as a single channel.

Known ways to implement parallel transmissions include: Polarization Division Multiplexing (PDM), where two signals are transmitted through the same medium by two signals having orthogonal polarizations; Wavelength Division Multiplexing (WDM), where the parallel channels are transmitted through the same medium by different optical carriers having different wavelengths; Space Division Multiplexing (SDM), where the parallel channels are transmitted through different mediums which can be bounded such as a fiber ribbon; and combinations of the previous multiplexing formats.

When using PDM, skew can appear between the multiplexed signals, for instance due to Differential Group Delay (DGD) which changes randomly on the transmission line. According to the encountered DGD, the skew between polarizations can exceed half a symbol period. In this case, when the data of the multiplexed polarizations are re-serialized after reception, the order of the recovered data bits is altered and the decoding of the received information is no longer possible.

Parallel transmission can also be implemented with WDM. The parallel lower rate channels are transmitted by lightwave carriers at different wavelengths or frequencies through the same medium. At the other end of the link, the parallel signals are demultiplexed according to their wavelengths; each channel is received and decoded by receivers. The electrical data from the parallel receivers are then converted from parallel to serial. Intra channel skew can appear inside the medium due to chromatic dispersion (CD) or due to the difference of length between the electrical paths after reception.

Another way to implement parallel transmission is SDM which uses fiber ribbons. The link skew in SDM is due to difference in the fiber length or conditions. With higher bit rates, the symbol rate transmitted through the fiber increases, which means the symbol periods become shorter. Therefore, the skew problem becomes critical with higher bit rates.

Therefore, increasing the transmission capacity through parallelization requires a way to compensate the skew between the parallel channels after the reception and before the re-serialization. This can be done by adding more information to the channel in addition to the data, in order to get information on the skew between the parallel channels. This may be done on the physical layer or on higher layers.

On the other hand, increasing the symbol rate or baud rate of the transmitted signal enables to increase the capacity of a transmission channel and therefore the total capacity of the transmission system. However, impairment appearing inside the transmission medium, which is related to physical constant of the medium such as DGD or CD, has a bigger impact on signals with higher bit rates. In other words, signals with higher baud rates are more affected by CD or DGD. As a consequence, means of monitoring CD and DGD, which relate to the signal baud rate, will have tighter monitoring ranges when they are applied to higher baud rate signals. Monitoring impairments can be done by adding more information to the channel in addition to the data on the physical layer or higher layers.

Adding information to the signal in order to monitor impairments or skew between parallel channels can be done in different ways. One can be grouped as data aided methods.

An example of related data aided methods is disclosed in the non patent literature 1 (NPL1). In data aided equalization, training patterns are used to eliminate the ambiguity on polarizations and transmitted symbols. All possibilities for the attribution of ambiguous variable are tried until the training pattern is recognized. In this case, buffer or time delaying filters can be used to correct the delay between polarizations until the training pattern is recognized. Alternatively, the received pattern can be compared with several recognition patterns for possible cases of delay until there is a match, which enables to retrieve and correct the delay between polarizations.

In a similar manner, non patent literature 2 (NPL2) discloses that the skew between channels in WDM is rectified by using of the XAUI standard, which relies on channel decoding and realigning. This requires an increase of the total bit rate for the same transmitted data payload because the prefix needed for alignment is introduced in the transmitted data. In addition, the skew monitoring requires the information of upper layer information.

In conjunction with the above description, patent literatures 1-4 (PTL1-4) disclose that the skew between parallel channels can be monitored and corrected.

According to PTL1, a special pattern is required which is named PING or PONG depending on the case, and is added to the actual data to be transmitted. PING and PONG pattern carry no information and are used only for the purpose of skew monitoring or compensation. Therefore, to carry effectively m bits of data within the network, it is necessary that a number of bits contained in PING or PONG are added to m bits to be physically transmitted through the network. Moreover, in PTL1, the receiver must distinguish PING and PONG patterns from the data.

According to PTL2 as well as PTL1, the synchronization overheads are inserted into the transmitted data and are received for different parallel channels to monitor skew.

Also, according to PTL3, it is necessary that m' frame bits are added to the actual data to be transmitted. Therefore, to carry effectively m bits of data within the network, m+m' bits are required in fact to be physically transmitted through the network.

According to PTL4, the multiplexed optical-packet signal is transmitted to a transmission destination and it is retransmitted back to a transmission source. At the head of each packet, there is a skew detection byte for detecting a skew amount. A skew amount of the optical packet is detected by comparing the arrival timing of the skew detection byte of the packet with that of the first arrival packet as a reference.

Adding information to the signal in order to monitor impairments or skew between parallel channels can be done in another way. This can be grouped as tone aided methods. The information on skew between parallel channels is necessary to compensate the skew. The information could be obtained by imprinting a tone signal at the transmitters of different channels and by extracting the tone at the receiver and comparing the phase of the extracted tones. Identically, the tone aided methods enable to monitor other impairments such as chromatic dispersions.

The easiest implementation is to use in-band tones, where the tone frequency is lower than the baud rate of the transmitted signal. Implementations and problems related to in-band tone signals are illustrated in the non patent literature 3 (NPL3). Low frequency tones, namely in the kilohertz range, can be easily achieved by directly modulating the laser.

In a similar manner, the non patent literature 4 (NPL4) disclosed the use of an in-band pilot tone in order to monitor CD impairing the optical signal, on which the tones are imprinted.

Higher tone frequencies can be achieved at the cost of moderate complexity by imprinting the tone on the modulator modulating the optical signal. In this way, better monitoring precision could be achieved, but the method is limited by the inherent sensitivity degradation as the tone is imprinted in-band with the signals, and the signal symbols are affected by the tone modulation. Moreover, the realization of reliable skew monitors requires tones imprinted with high modulation indices, which increase the signal degradation in the process.

The non patent literature 5 (NPL5) showed that the penalty caused by in-band tones could be reduced by using out-of-band tones. In that method, the tones are up-converted with a subcarrier at the frequency of twice the baud rate of the signal to reduce the degradations due to tone signal interaction when using practical modulation indices for skew monitoring.

Another example of a method enabling monitoring transmitted signals is disclosed in the non patent literature 6 (NPL6). In NPL6, it is proposed to use Pseudo-Return-to-Zero modulation scheme in order to monitor the skew between parallel channels. The retrieved signals after reception contain the information of the skew between polarization multiplexed channels. The information could be used to compensate for the skew.

CITATION LIST

Patent Literature

PTL1: Japanese Patent Application Laid-Open Publication No. 2003-218844
PTL2: Japanese Patent Application Laid-Open Publication No. 2010-130574
PTL3: Japanese Patent Application Laid-Open Publication No. Hei 11-341102
PTL4: Japanese Patent Application Laid-Open Publication No. 2008-219166

Non Patent Literature

NPL1: S. J. Savory et al., "Ultra Long-Haul QPSK Transmission using Digital Coherent Receiver", Proc. 2007 IEEE/LEOS Summer Topical Meeting. (pp. 13-14).
NPL2: M. Tomizawa et al., "Terabit LAN with Optical Virtual Concatenation for Grid Applications with Super-Computers", Optical Fiber Communication Conference (OFC) 2005 OThG6.
NPL3: M. Murakami et al., "A Remote Supervisory System Based on Subcarrier Overmodulation for Submarine Optical Amplifier Systems", Journal of Lightwave Technology, vol. 14, No. 5, May 1996.
NPL4: M. N. Peterson et al., "Online Chromatic Dispersion Monitoring and Compensation Using a Single Inband Subcarrier Tone", IEEE Photonics Technology Letters, Vol. 14, No. 4, April 2002.
NPL5: O. H. Adamczyk et. al., "Coarse and Fine Bit Symchronization for WDM Interconnections Using Two Subcarrier-Multiplexed Control Pilot Tones", Photonics Technology Letters, vol. 11, No. 8, August 1999.
NPL6: E. Le Taillandier de Gabory et al. "Pseudo-Return-to-Zero Modulation Scheme: Application to the Compensation of Intra-Polarization Skew for PolMux Signals", ECOC 2009 Paper 3.4.4.

SUMMARY OF INVENTION

Technical Problem

All the data aided approaches require training patterns or fixed data prefixed which are transmitted in addition to data. They induce an increase in bit rate at constant payload. Therefore, this necessitates using electronics and electro-optics components with wider bandwidth which are more expensive or may not be available. Otherwise the transmission will suffer degradation. Moreover, these methods require comparison for each possible case of received patterns. Therefore, they multiply the calculation time and memory capacity required by the number of cases to study. This will consume more electrical power for the increased computation requirements.

The data aided methods also require careful design of the training sequences so that they are not mistaken with data. This complicates framing or coding the data. These methods are also dependent on data reception, which may cause problem in detection when the Bit Error Rate (BER) is low. In addition, these methods necessitate feedback from the pattern recognition result or the information of higher layers to the compensation part or equalization part on the physical layer. This can complicate receiver design and cause a problem of the stability in the receiver. Finally, since the data aided methods rely on transmitted sequences, in case of monitoring skew between parallel channels or other impairments, their resolution is limited to one symbol of the signal. Therefore, it may not be sufficient for fine monitoring or fine tracking of skew.

In the case of low frequency in-band tones, they lead to very low precision for monitoring due to the long period of the tone. Moreover, ghost tones effects appear when erbium-doped optical fiber amplifiers (EDFA) are used in the transmission system, which affect other channels and modify the monitoring information on the affected channels. In addition, in-band tone causes a degradation of the signal, on which they are imprinted. Moreover, there is a trade-off between the modulation index of the tone, which determines the tolerance of the tone information to noise, and the sensitivity of the transmitted information.

Moreover, out-of-band tone methods are not compatible with high bit rate and high capacity networks. Indeed, in the case of 100 Gb/s Dual Polarization QPSK (DP-QPSK) signal, the baud rate is 25 Gbaud and the subcarrier necessary to up-convert the tone would be 50 GHz. Therefore, the tone information would be located in the regions distant from 50 GHz on both sides of the optical carrier. But this part of the spectrum would be cut in WDM system with 50 GHz frequency spacing, as optical multiplexers and demultiplexers eliminate the signal outside a 25 GHz band on both side of the optical carrier for each optical channel. Moreover, RF components such as low pass filters and high pass filters with sharp filtering shapes around 25 GHz required by this methods are not commonly available, which complicates even more its realization and increases its cost. Finally, reported penalties with this method were still around 2 dB, which cannot be neglected from a system design point of view.

On the other hand, the signal modulated according to Pseudo-Return-to-Zero scheme has a less sensitivity than that of the same signal with Return-to-Zero (RZ) scheme.

As mentioned above, those related optical communications systems have a problem that it is difficult to fast, simply monitor impairments of received signals with higher receiver sensitivity.

An exemplary object of the invention is to provide an optical communication system with monitor functions and monitoring method therefore that can fast, simply monitor impairments of received signals with higher receiver sensitivity.

Solution to Problem

A monitoring method for an optical communication system according to an exemplary aspect of the invention includes the steps of emitting lightwave signals to be modulated according to a data, forming dips at transitions between temporally consecutive groups of n symbols of the lightwave signals, wherein the dips are formed at each of (n−1) first transitions of the group, no dip is formed at the n-th transition on the lightwave signals, receiving the lightwave signals, extracting frequency components characterized by the numerical value n from received lightwave signals, and monitoring the received lightwave signals by using the frequency components.

An optical communication system with monitor functions according to an exemplary aspect of the invention includes an optical transmitter, containing a carver forming dips on groups of temporally consecutive groups of n symbols, wherein a dip is formed at each of (n−1) first transitions between symbols, no dip is formed at the n-th transition in the lightwave signals, and an optical receiver, containing a coherent receiver receiving the lightwave signals, a processing unit extracting frequency components characterized by n from received lightwave signals and monitoring the received lightwave signals by using the frequency components.

Advantageous Effects of Invention

An exemplary advantage according to the invention is to be able to obtain an optical communication system with monitor functions and monitoring method therefor that enable to monitor fast, simply impairments of received signals with superior receiver sensitivity.

BRIEF DESCRIPTION OF DRAWINGS

FIG. 1 is a schematic representation of the implementation of an apparatus carving the amplitude of an optical signal according to the first exemplary embodiment.

FIG. 2 is a schematic representation of the implementation of an apparatus carving the amplitude of an optical signal according to the first exemplary embodiment.

FIG. 3 is a schematic representation of the implementation of an apparatus carving the amplitude of an optical signal according to the first exemplary embodiment.

FIG. 4 is a schematic representation of the implementation of a transmitter featuring the first exemplary embodiment.

FIG. 5 is a schematic representation of the implementation of a narrow clock source generating a narrow pulse clock.

FIG. 9 is a schematic representation of the implementation of a transponder according to the second exemplary embodiment.

FIG. 10 is a schematic representation of the implementation of a transponder according to the third exemplary embodiment.

FIG. 11 is a schematic representation of the implementation of a transponder according to the fourth exemplary embodiment.

FIG. 12 is a schematic representation of the implementation of a transponder according to the fifth exemplary embodiment.

[FIG. 14] FIG. 14 is a table containing simulation results of Q factor for the signals generated by using the embodiments and for the conventional signals.

FIG. 15 is a diagram of the simulation results of transmission characteristics using the transponder according to the second embodiment.

FIG. 16 is an RF power spectrum of the optical signals carved according to related PRZ.

FIG. 17 is simulation results of the RF power difference of specific frequency components.

DESCRIPTION OF EMBODIMENTS

[First Exemplary Embodiment]

Figure 1:
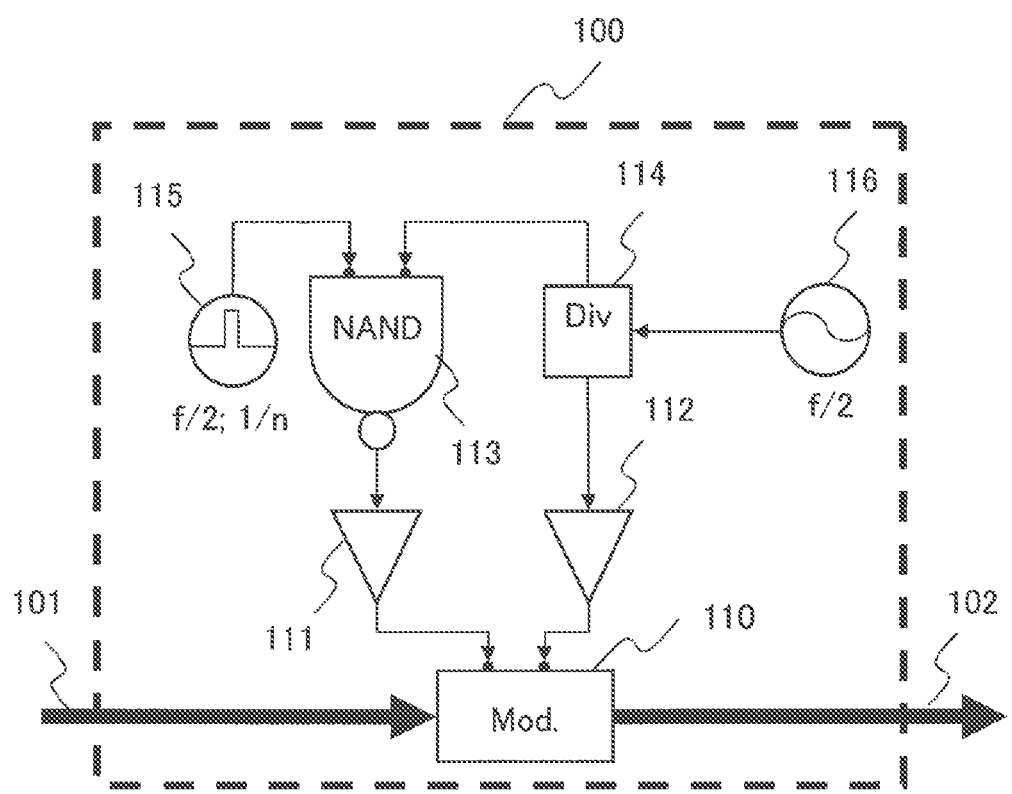
[FIG. 1]

FIG. 1 is a schematic representation of the implementation of an apparatus carving the amplitude of an optical signal, which is referred to as a caver hereafter, according to the present embodiment. A carver 100 carves an input lightwave signal 101 according to this embodiment and outputs an output lightwave signal 102. The input lightwave signal 101 can be already modulated according to the data to be transmitted. In this case, the timing of the carver 100 and the input lightwave signal 101 is controlled so that the middle of the temporally consecutive two pulses carved by the carver 100 is coincident with the central part of the modulated symbols.

The input lightwave signal 101 can also be partially modulated according to a tributary signal of the data to be transmitted. In this case, the output lightwave signal 102 is afterwards modulated accordingly to the remainder of the data to be transmitted. The timing of the carver 100 and the partially modulated input lightwave signal 101 is controlled so that the center of the pulses carved by the carver 100 is coincident with the central part of the modulated symbols.

If input lightwave signal 101 can be non-modulated, the output lightwave signal 102 is afterwards modulated according to the data to be transmitted. And the modulated data is synchronized so that the central part of the modulated data is coincident with the pulses carved by the carver 100.

A modulator 110 is used to carve the amplitude of the input lightwave signal 101. A clock 116 outputs an electrical clock signal at a frequency which is equal to half the baud rate of the data to be transmitted. Alternatively, the clock signal can be provided by an external source. The divider 114 splits the clock signal generated by the clock 116 into two equal signals. A narrow pulse clock source 115 generates a narrow pulse clock from a master clock source at half the baud rate. The narrow pulse clock can be generated inside the narrow pulse clock source 115 or provided through the clock 116. The duty cycle of the narrow pulse clock source 115 is equal to 1/n, where n is the index characterizing the pulse carving of this embodiment. The configuration of the narrow pulse clock source 115 is later explained by using FIG. 5. A logic gate 113 performs NAND operation on the narrow pulse clock and the clock signal generated by the clock 116. Driver amplifiers 111 and 112 respectively transform the outputs of the logic gate 113 and the divider 114 into electrical signals with suitable amplitudes to drive the modulator 110. For instance, the modulator 110 is a Mach-Zehnder differential modulator. The output amplitudes of driver amplifiers 111 and 112 can be Vπ, which is the voltage necessary for changing the optical phase by π and sets the Mach-Zehnder to destructive interference.

Figure 6A:
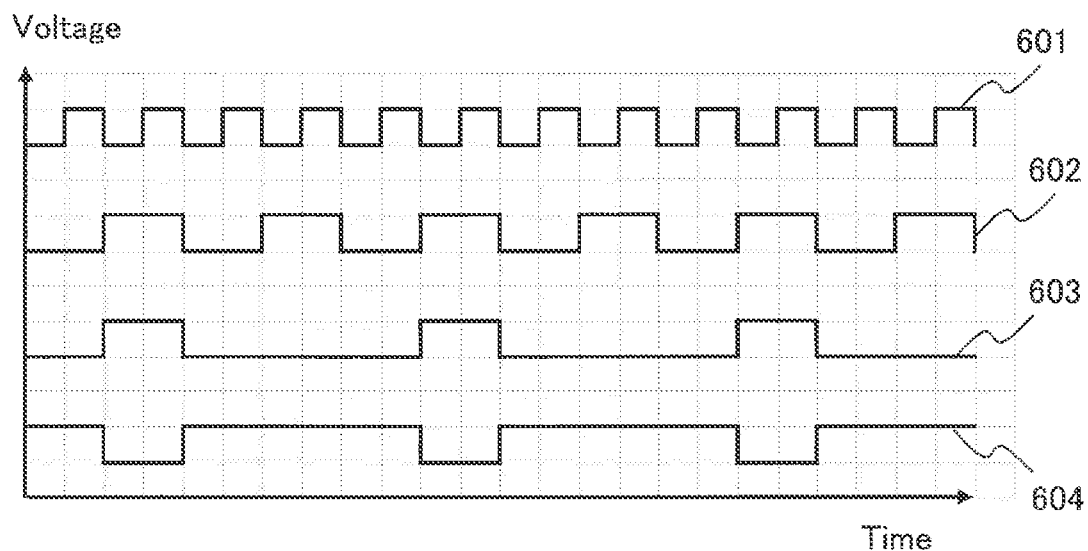
[FIG. 6] 6A is a time chart corresponding to the signals of the carver shown in FIG. 1, 6B is a time chart corresponding to the signals of the carver shown in FIG. 2, 6C is a time chart corresponding to the signals of the carver shown in FIG. 3, and 6D is a time chart corresponding to the signals of the narrow clock source shown in FIG. 5.

The time charts of the signals used by the carver 100 are illustrated on FIG. 6A. The waveform of a signal carved by the carver 100 is illustrated on FIG. 7A. The RF spectrum of a signal carved by the carver 100 is illustrated on FIG. 8A.

Figure 7A:
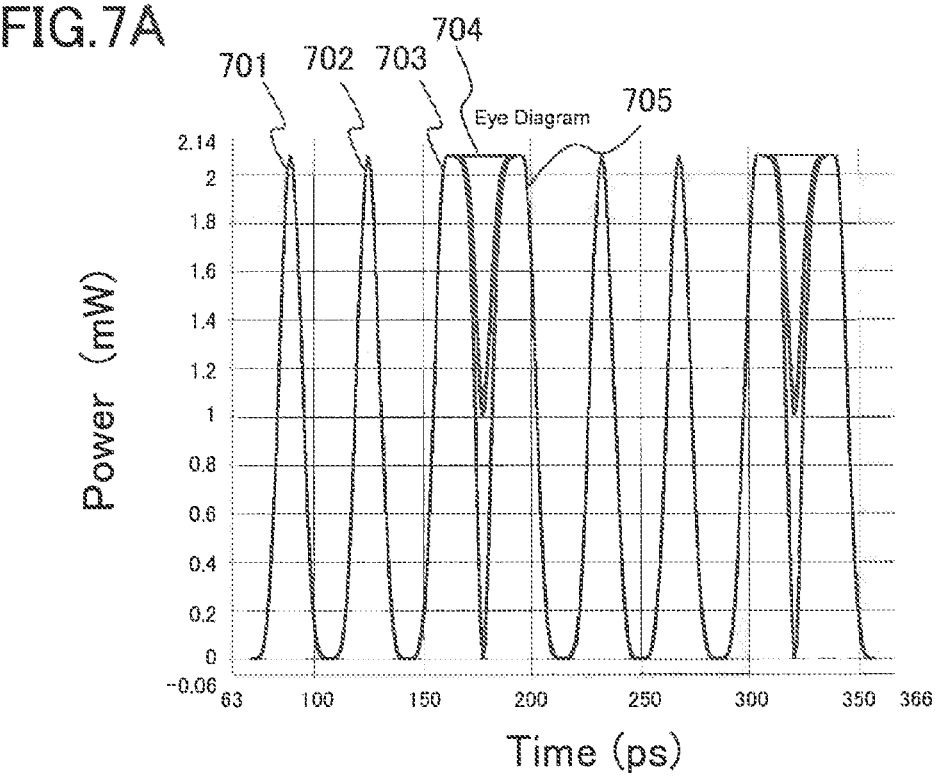
[FIG. 7] 7A is a simulated waveform of the output lightwave signal of the carver represented on FIG. 1, 7B is a simulated waveform of the output lightwave signal of the carver represented on FIG. 2, 7C is a simulated waveform of the output lightwave signal of the carver represented on FIGS. 3, and 7D is a simulated waveform of the input lightwave signal.

As shown in FIG. 7A, a dip is formed at each of the symbol transition points except n-th symbol transition point in modulated lightwave signals. This is described in detail, as follows. The carver 100 carves (n−2) temporally consecutive pulses, which period is equal to the symbol period. The temporally following (n−1)-th symbol has a rising edge, which is carved in a similar manner. On the other hand, the constraint on the amplitude during the transition between the (n−1)-th symbol and the n-th symbol is released. That is to say, the amplitude is kept unaffected during the transition between the (n−1)-th symbol and the nth symbol. The falling edge of the n-th symbol is carved in the same manner as the (n−2) pulses have already been carved. The temporally following train of n pulses is carved in a similar manner. The output lightwave signal 102 has information imprinted in addition to the data without an increase of the bit rate. The duty cycle of the pulses carved on the output lightwave signal 102 is 33%.

Figure 2:
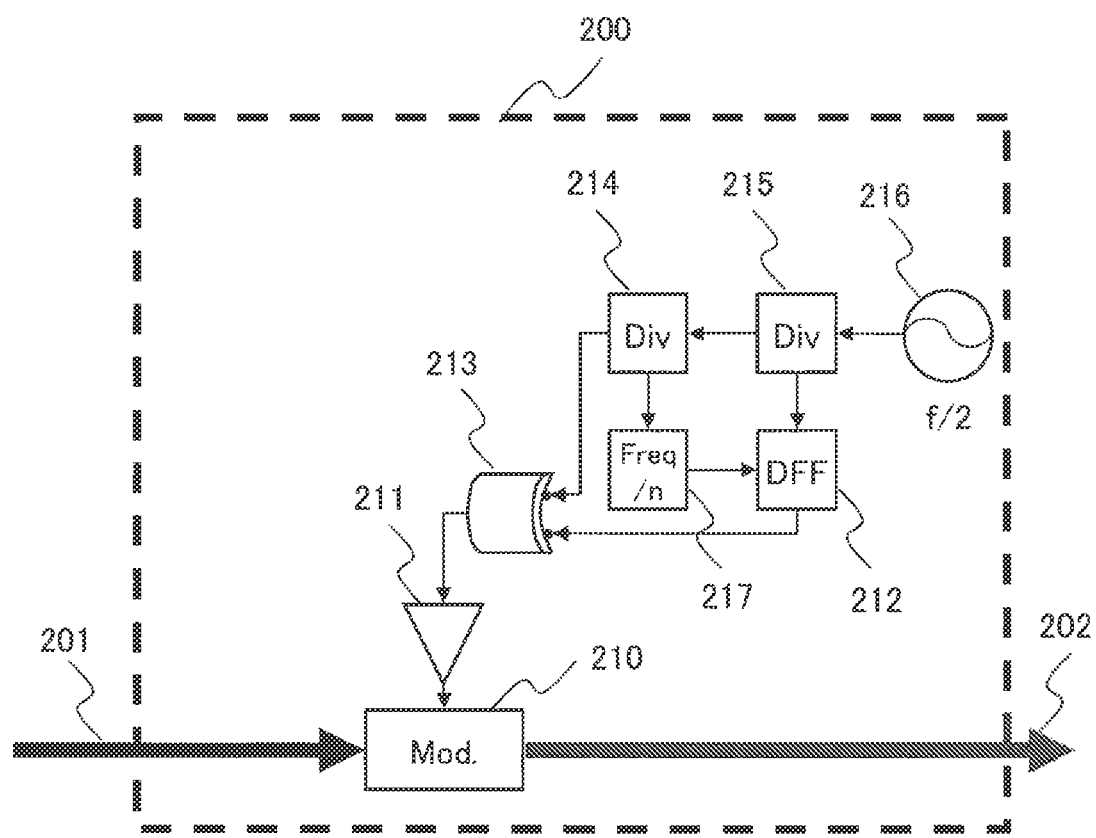
[FIG. 2]

FIG. 2 is a schematic representation of the implementation of another carver according to the present embodiment. A carver 200 carves an input lightwave signal 201 according to this embodiment. The output lightwave signal 202 is carved by the carver 200. The input lightwave signal 201 can be already modulated according to the data to be transmitted. In this case, the timing of the carver 200 and the input lightwave signal 201 is controlled so that the center of the pulses carved by the carver 200 is coincident with the central part of the modulated symbols.

The input lightwave signal 201 can also be partially modulated according to a tributary signal of the data to be transmitted. In this case, the output lightwave signal 202 is afterwards modulated according to the remainder of the data to be transmitted. The timing of the carver 200 and the partially modulated input lightwave signal 201 is also controlled so that the center of the pulses carved by the carver 200 is coincident with the central part of the modulated symbols.

If the input lightwave signal 201 can be non-modulated, the output lightwave signal 202 is afterwards modulated according to the data to be transmitted. And the modulated data is synchronized so that the central part of the modulated data is coincident with the pulses carved by the carver 200.

A modulator 210 is used to carve the amplitude of the input lightwave signal 201. A clock 216 outputs an electrical clock signal at a frequency which is equal to half the baud rate of the data to be transmitted. The clock 216 can be generated inside the carver 200 or it can be provided by an external source. The dividers 214 and 215 split the clock signals generated by the clock 216 into two equal signals. Each output of the dividers 214 and 215 is an electrical clock signal with the same frequency as that of the clock 216. The frequency divider 217 divides the frequency of the clock signal distributed by the divider 214 by n, where n is the index characterizing the pulse carving of this embodiment. The D-type Flip Flop (DFF) 212 generates a signal according to the clock at the frequency f/2n generated by the frequency divider 217 used as data and the clock at the frequency f/2 distributed by the divider 215 used as clock.

Figure 6B:
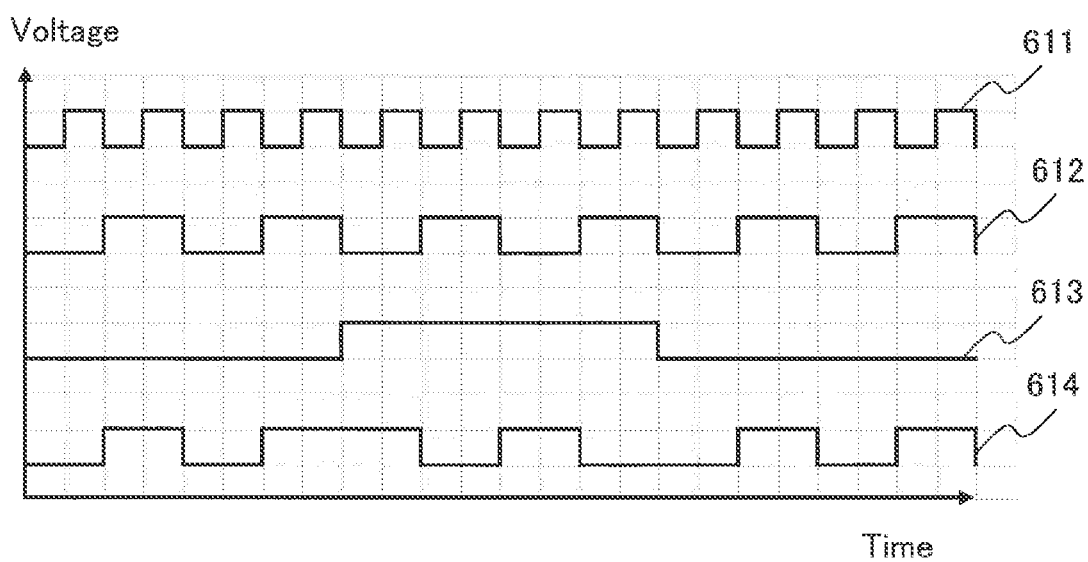

Proper phase alignment is done by design of the electrical paths to match the time chart of FIG. 6B. A logic gate 213 performs XOR operation on the clock at the frequency f/2 and the output of the DFF 212. The driver amplifier 211 transforms the output of the logic gate 213 into electrical signal of suitable amplitude to drive the modulator 210. For instance, the modulator 210 is a single drive Mach-Zehnder modulator. The amplitude of the output of the driver amplifier 211 can be 2×Vπ.

The time charts of the signals used by the carver 200 are illustrated on FIG. 6B. The waveform of a signal carved by the carver 200 is illustrated on FIG. 7B. And the RF spectrum of a signal carved by the carver 200 is illustrated on FIG. 8B.

Figure 7B:
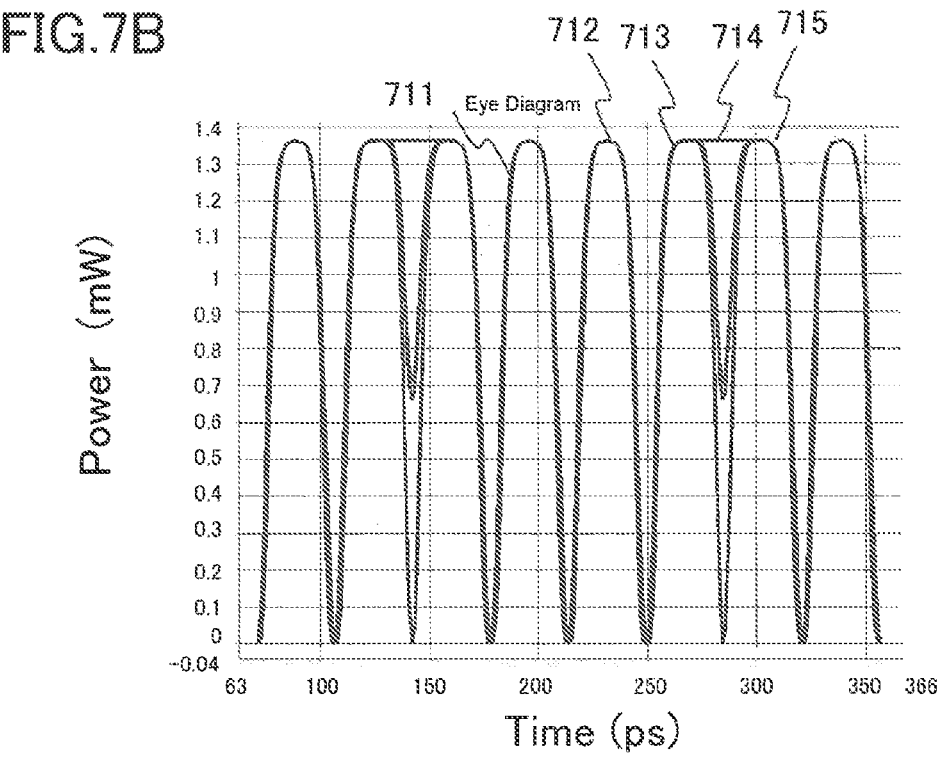

As shown in FIG. 7B, a dip is formed at each of the symbol transition points except n-th symbol transition point in modulated lightwave signals. This is described in detail, as follows. The carver 200 carves (n−2) temporally consecutive pulses, which period is equal to the symbol period. The temporally following (n−1)-th symbol has a rising edge, which is carved in a similar manner. On the other hand, the constraint on the amplitude during the transition between the (n−1)-th symbol and the n-th symbol is released. That is to say, the amplitude is kept unaffected during the transition between the (n−1)-th symbol and the n-th symbol. The falling edge of the n-th symbol is carved in the same manner as the (n−2) pulses have already been carved. The temporally following train of n pulses is carved in a similar manner. The output lightwave signal 202 has information imprinted in addition to the data without an increase of the bit rate. The duty cycle of the pulses carved on the output lightwave 202 is 66%.

Figure 3:
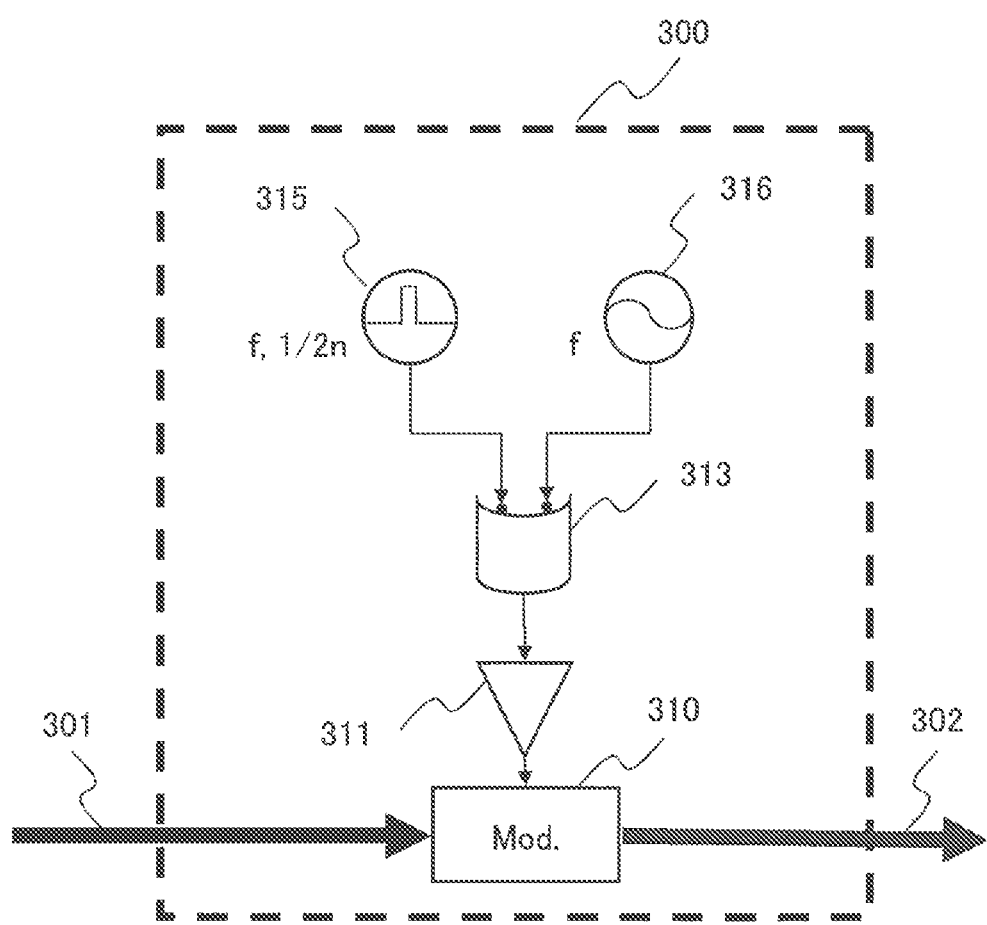
[FIG. 3]

FIG. 3 is a schematic representation of the implementation of yet another carver according to the present embodiment. A carver 300 carves an input lightwave signal 301 according to this embodiment and outputs an output lightwave signal 302. The input lightwave signal 301 can be already modulated according to the data to be transmitted. In this case, the timing of the carver 300 and the input lightwave signal 301 is controlled so that the center of the pulses carved by the carver 300 is coincident with the central part of the modulated symbols.

The input lightwave signal 301 can also be partially modulated according to a tributary signal of the data to be transmitted. In this case, the output lightwave signal 302 is afterwards modulated according to the remainder of the data to be transmitted. The timing of the carver 300 and the partially modulated signal 301 is controlled so that the center of the pulses carved by the carver 300 is coincident with the central part of the modulated symbols.

If the input lightwave signal 301 can be non-modulated, the output lightwave signal 302 is afterwards modulated according to the data to be transmitted. And the modulated data is synchronized so that the central part of the modulated data is coincident with the pulses carved by the carver 300.

A modulator 310 is used to carve the amplitude of the input lightwave signal 301. A clock 316 outputs an electrical clock signal at a frequency which is equal to the baud rate of the data to be transmitted. The clock 316 can be generated inside the carver 300 or it can be provided by an external source. A narrow pulse clock source 315 generates a narrow pulse clock from a master clock source at the baud rate. The narrow pulse clock can be generated inside the narrow pulse clock source 315 or provided through the clock 316. The duty cycle of the narrow pulse clock source 315 is equal to 1/(2n), where n is the index characterizing the pulse carving of this embodiment. The configuration of the narrow pulse clock source 315 is later explained by FIG. 5.

A logic gate 313 performs OR operation on the narrow pulse clock generated by the narrow pulse clock source 315 and the clock signal generated by the clock 316. The timing of the inputs of the logic gate 313 is set by design of the electrical path so that the electrical signals match the time charts of FIG. 6C. The driver amplifier 311 transforms the output of the logic gate 313 into electrical signal of suitable amplitude to drive the modulator 310. For instance, the modulator 310 is a single drive Mach-Zehnder modulator. The amplitude of the output of the driver amplifier 311 can be Vπ.

Figure 6C:
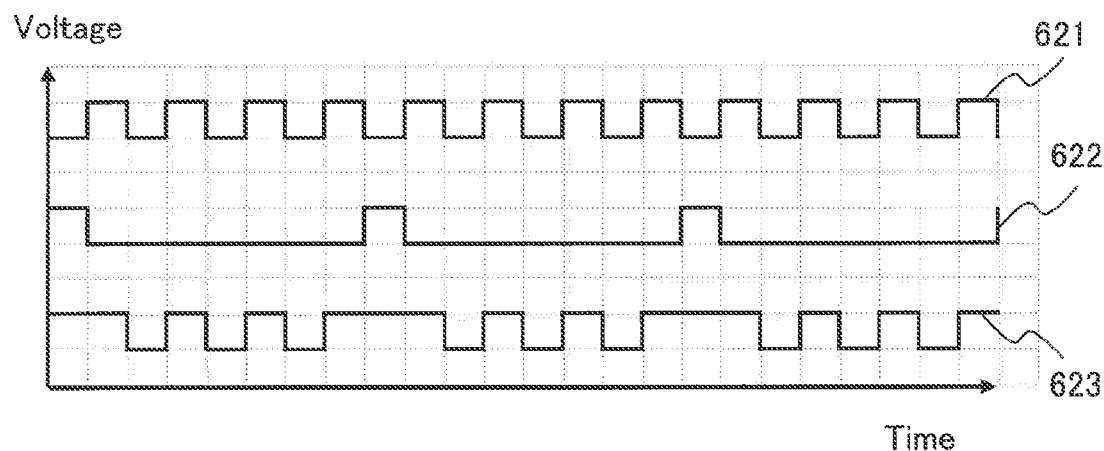

The time charts of the signals used by the carver 300 are illustrated on FIG. 6C. The waveform of a signal carved by the carver 300 is illustrated on FIG. 7C. The RF spectrum of a signal carved by the carver 300 is illustrated on FIG. 8C.

Figure 7C:
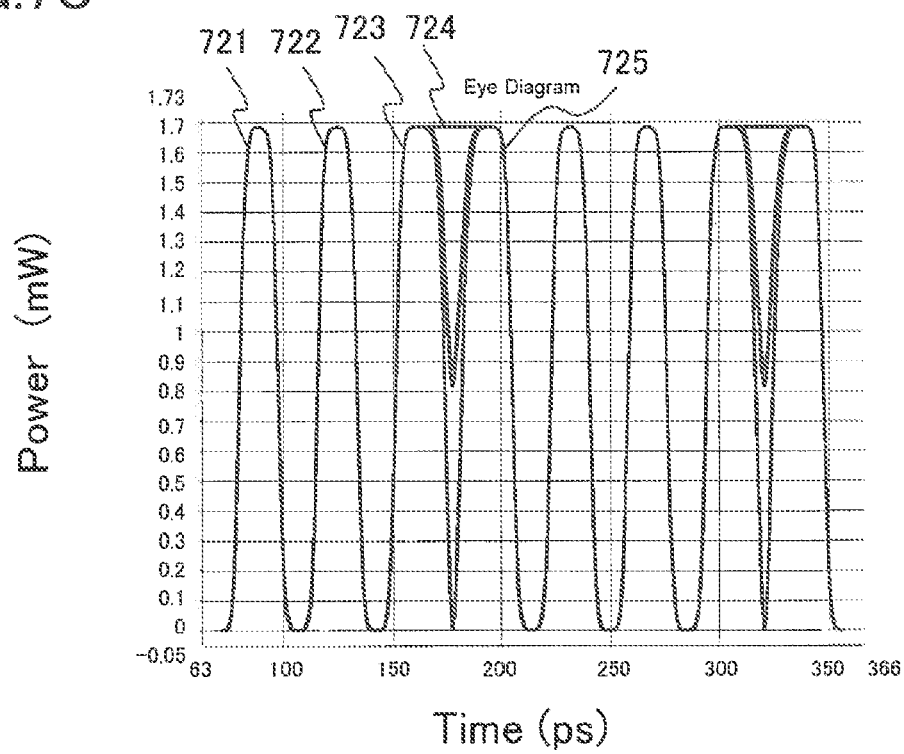

As shown in FIG. 7C, a dip is formed at each of the symbol transition points except n-th symbol transition point in modulated lightwave signals. This is described in detail, as follows. The carver 300 carves (n−2) temporally consecutive pulses, which period is equal to the symbol period. The temporally following (n−1)-th symbol has a rising edge, which is carved in a similar manner. On the other hand, the constraint on the amplitude during the transition between the (n−1)-th symbol and the n-th symbol is released. That is to say, the amplitude is kept unaffected during the transition between the (n−1)-th symbol and the n-th symbol. The falling edge of the n-th symbol is carved in the same manner as the (n−2) pulses have already been carved. The temporally following train of n pulses is carved in a similar manner. The output lightwave signal 302 has information imprinted in addition to the data without an increase of the bit rate. The duty cycle of the pulses carved on the output lightwave 302 is 50%.

Figure 4:
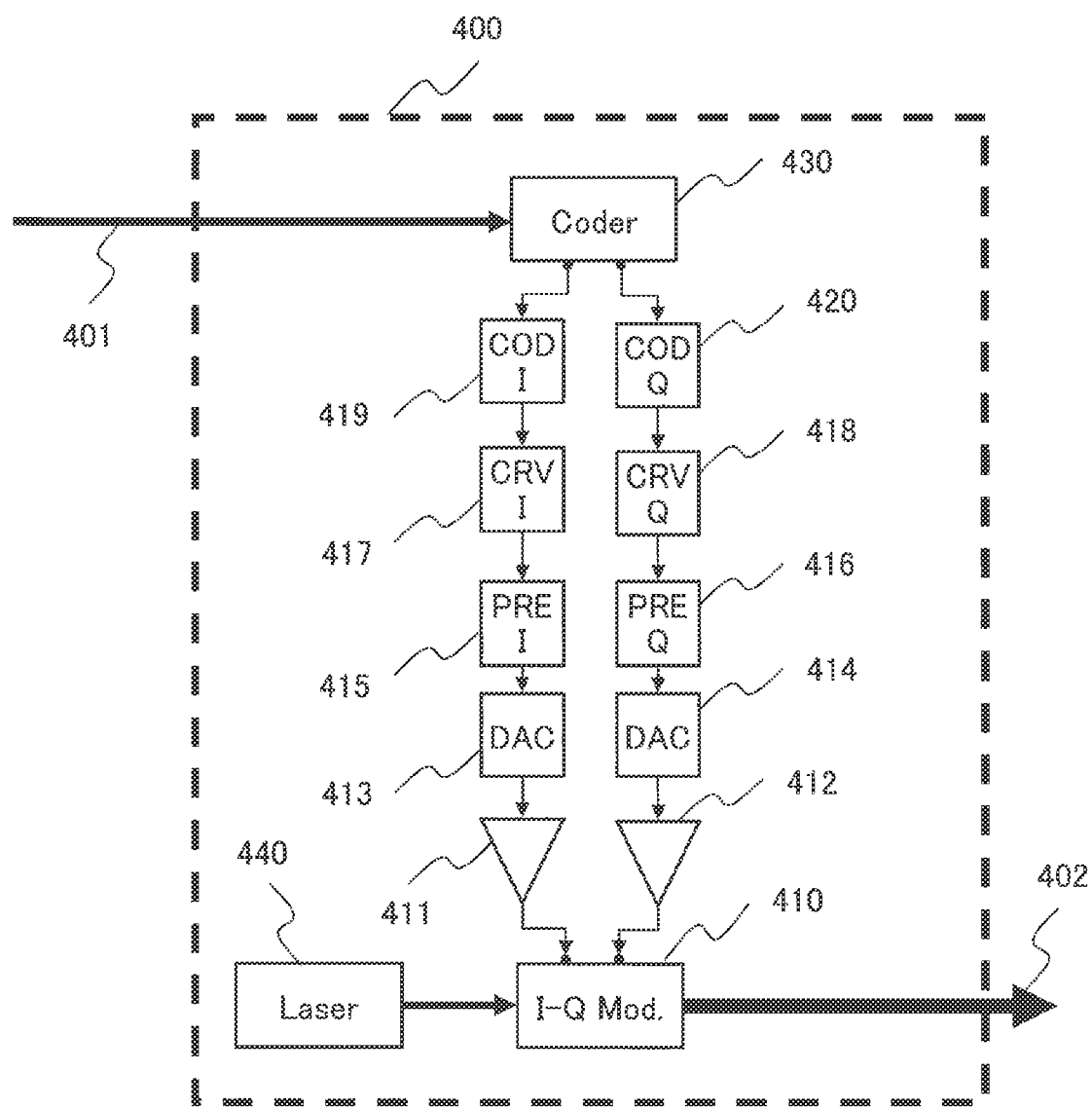
[FIG. 4]

FIG. 4 is a schematic representation of the implementation of a transmitter featuring the present embodiment. The transmitter 400 emits a lightwave signal 402 which is modulated according to a binary data stream 401. The amplitude of the lightwave signal 402 is carved according to the present embodiment. The laser 440 emits continuous waveform (CW) light, which is modulated by a Cartesian modulator 410. The Cartesian modulator 410 modulates the light emitted by the laser 440 according to the binary data stream 401 and carves at the same time the lightwave signal according to the present embodiment. For instance, the Cartesian modulator 410 is a parent Mach-Zehnder modulator with two nested children Mach-Zehnder modulators, one for the in-phase (I) modulation and the other one for the quadrature phase (Q) modulation. The Q modulated data is phase shifted by π/2.

A coder 430 transforms the binary data stream 401 into two streams for modulation on I and Q by the Cartesian modulator 410. A coder 419 (420) transforms the outputs of the coder 430 into data to finally drive a digital to analog converter (DAC) 413 (414). For instance, if the transmitter 400 emits the light modulated according to the 16 QAM format, the coders 419 and 420 will produce data so that the output of the digital to analog converters (DAC) 413 and 414 becomes a four level electrical signal. A carver 417 (418) transforms the data generated by the coders 419 and 420 so that the Cartesian modulator 410 carves the amplitude of the lightwave signal 402 according to the present embodiment.

If the digital to analog converters (DAC) 413 and 414 have a sampling rate which is the double of the baud rate of the signal, the data produced by the coder 419 will have the information of two samples per symbol of the lightwave signal 402. Considering that odd indices k reflect central parts of symbols and even indices k reflect transitions between symbols. If the output of the k-th sample of the coder 419 is represented by Code I(k) and the output of the carver 417 for the same sample is represented by Carve I(k), Carve I(k) can be defined in function of the carving index n of the present embodiment as follows:

a) if (k=1 modulo 2), then Carve I(k)=Code I(k)
b) if ((k=0 modulo 2) and (k≤(2×n−4) modulo 2×n)), then Carve I(k)=Null
c) if ((k=0 modulo 2) and (k≤(2×n−2) modulo 2×n)), then Carve I(k)=Code I(k)

where Null corresponds to the point coding the null point on the constellation map of the signal modulated by the Cartesian modulator 410. The step c) can also be replaced as follows:

c') if ((k=0 modulo 2) and (k≥(2×n−2) modulo 2×n)), then Carve I(k)=MAX where MAX corresponds to the point coding one of the maximal amplitude points on the constellation map of the signal modulated by the Cartesian modulator 410. The output of the carver 418 (Carve Q) is defined in a similar manner according to the output of the coder 420 (Code Q).

A pre-compensator 415 (416) transforms the output of the carver 417 (418) so that the modulation of the transmitter 400 features pre-distortion, which can pre-compensate for chromatic dispersion or other impairments that the lightwave signal 402 will encounter during the transmission. The pre-compensator 415 (416) can also partially compensate for the non-linearity of the Cartesian modulator 410. The digital to analog converters (DAC) 413 and 414 will generate analog signals according to the outputs of the pre-compensators 415 and 416 respectively. The signals generated by the digital to analog converters (DAC) 413 and 414 are amplified by driver amplifiers 411 and 412 respectively in order to drive the I and Q modulation inputs of the Cartesian modulator 410.

The Cartesian modulator 410 carves (n−2) temporally consecutive pulses, which period is equal to the symbol period. The temporally following (n−1)-th symbol has a rising edge which is carved in a similar manner, while the constraint on the amplitude during the transition between the (n−1) -th symbol and the n-th symbol is released. The falling edge of the n-th symbol is carved in the same manner as the pulses already carved between the (n−2) already carved pulses. The temporally following train of n pulses is carved in a similar manner. The lightwave signal 402 has information imprinted in addition to the data without an increase of the bit rate.

In another embodiment, the index of pulse carving n is tunable and is tuned during operation by setting the proper parameter on the carvers 417 and 418.

Figure 5:
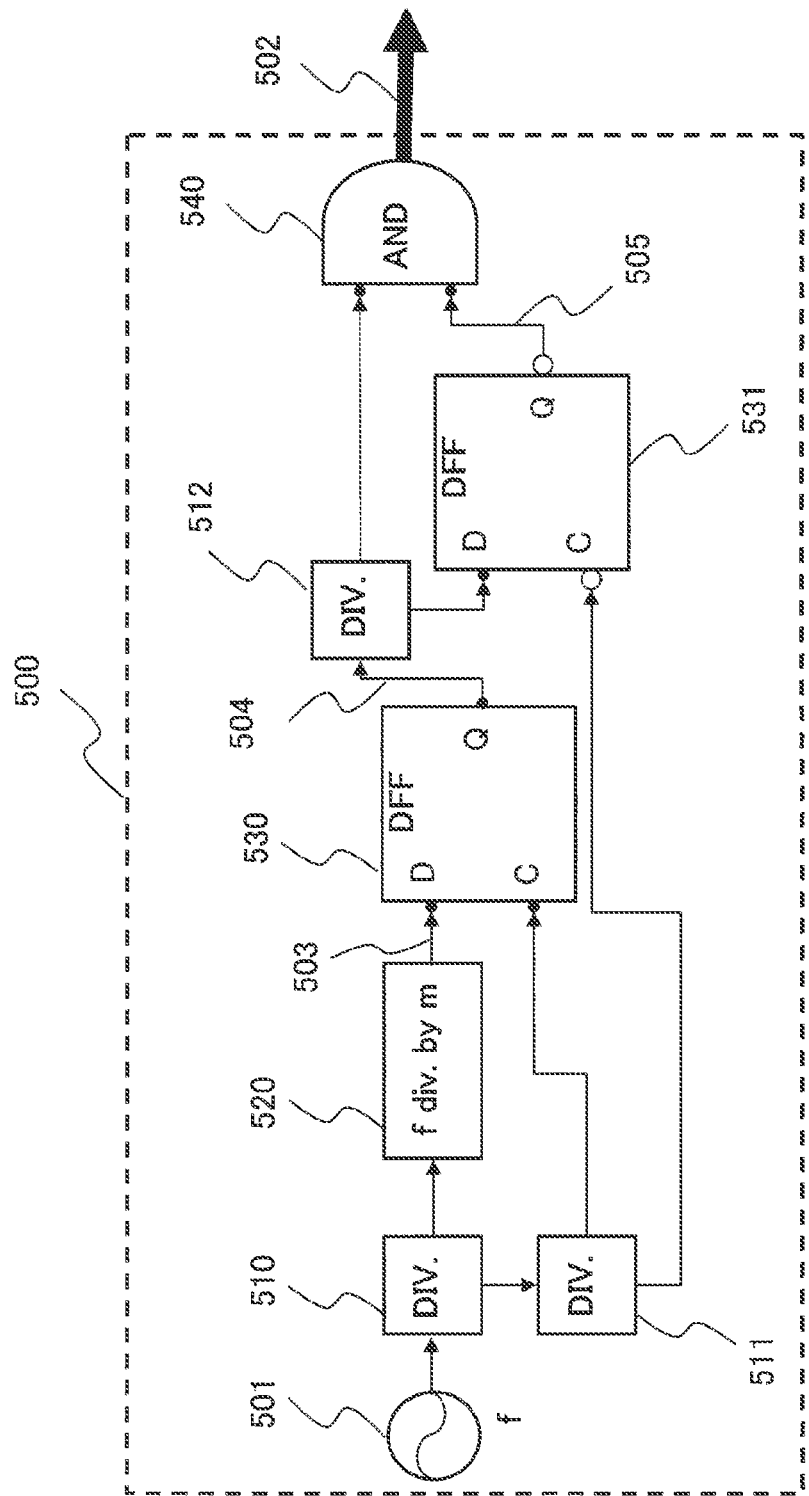
[FIG. 5]

FIG. 5 is a schematic representation of a narrow clock source 500 used to generate a narrow pulse clock. The narrow pulse clock is represented by order m, where one of the levels occupies half of a symbol period and the other level occupies (m−1) plus half of a symbol period. With this definition, a narrow pulse clock of order 1 is a 50% duty cycle clock. Therefore, we consider only narrow pulse clock with finite order m, where m is greater or equal to 2.

An electrical signal 501 is a standard 50% duty clock of frequency f. The clock generated by the electrical signal 501 is split twice by dividers 510 and 511. Alternatively, the clock of the electrical signal 501 can be provided by a source external to the narrow clock source 500. One of the divided tributaries of the electrical signal 501 is divided in frequency by a factor m by a frequency divider 520. Therefore, an electrical signal 503 is a 50% duty cycle clock at the frequency f/m. The electrical signal 503 is fed into a D input of a DFF (Delay Flip-Flop) 530, and the clock signal at f is fed to another input C. An output signal Q of the DFF 530, noted 504, is divided by a divider 512. One divided tributary is fed into a D input of a DFF 531. The clock signal at f is also fed into an inverted input C of the DFF 531. The other output of the divider 512 is fed into a logical gate (AND) 540. Another input of the logical gate (AND) 540 is the inverted output Q, noted 505, of the DFF 531. The relative phases of the DFF 530, the DFF 531 and the logical gate (AND) 540 are adjusted so that an output 502 of the logical gate (AND) 540 is a narrow pulse clock with order m, as illustrated on the time chart of FIG. 6D. The narrow clock source 500 transforms the input clock at the frequency f into an output narrow pulse clock with order m.

FIG. 6 represents time charts of the carver 100 (shown in FIG. 1), the carver 200 (shown in FIG. 2), the carver 300 (shown in FIG. 3), and the narrow clock source 500 (shown in FIG. 5), respectively.

FIG. 6A is a time chart corresponding to the signals of the carver 100 shown in FIG. 1 for the case where the carving index n is equal to 4. The chart 601 represents a clock signal at the frequency f equal to the baud rate of the emitted signal for reference. The chart 602 represents the clock signal at the frequency f/2, generated by the clock 116. The chart 603 is a narrow pulse clock generated by the narrow pulse clock source 115, generated by a clock at the frequency f/2 and with a duty cycle of 1/n, where n=4. The chart 604 represents the output of the logic gate 113. The modulator 110 is driven by signals proportional to the chart 602 and the chart 604, according to the present embodiment. The resulting waveform is displayed on FIG. 7A.

FIG. 6B is a time chart corresponding to the signals of the carver 200 shown in FIG. 2 for the case where the carving index n is equal to 4. The chart 611 represents a clock signal at the frequency f equal to the baud rate of the emitted signal for reference. The chart 612 represents the clock signal at the frequency f/2, generated by the clock 216. The chart 613 is clock at the frequency f/2n, where n=4, generated by the frequency divider 217. The chart 614 represents the output of the logical gate 213. The modulator 210 is driven by a signal proportional to the chart 614, according to the present embodiment. The resulting waveform is displayed on FIG. 7B.

FIG. 6C is a time chart corresponding to the signals of the carver 300 shown in FIG. 3 for the case where the carving index n is equal to 4. The chart 621 represents the clock signal at the frequency f, generated by the clock 316. The chart 622 is a narrow pulse clock generated by the narrow pulse clock source 315, generated by a clock at the frequency f and with a duty cycle of 1/2n, where n=4. The chart 623 represents the output of the logic gate 313. The modulator 310 is driven by a signal proportional to the chart 623, according to the present embodiment. The resulting waveform is displayed on FIG. 7C.

Figure 6D:
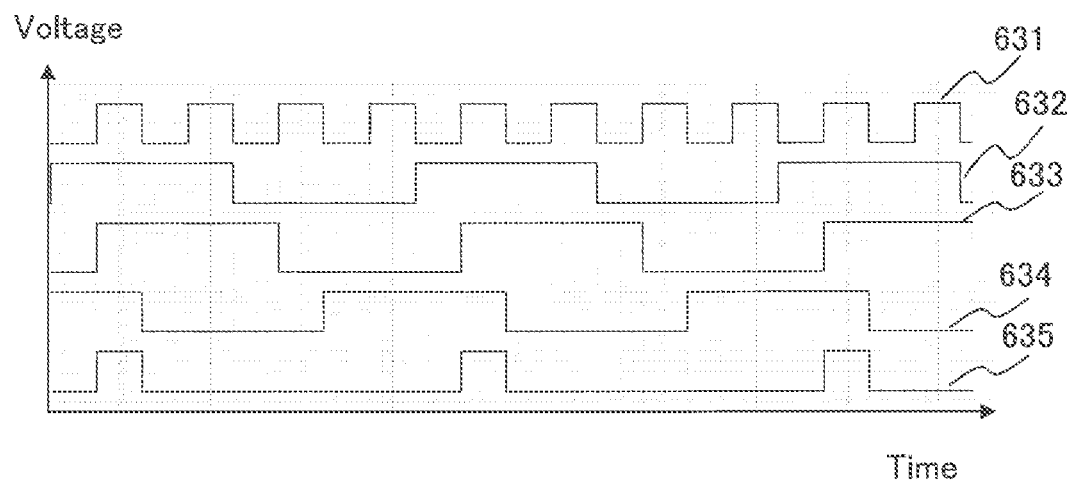

FIG. 6D is a time chart corresponding to the signals of the narrow clock source 500 shown in FIG. 5, where the order m is taken as m=4. The signals 631, 632, 633,634, and 635 are the respective time charts of the signals 501, 503, 504, 505, and 502 in FIG. 5. The chart 631 is a clock at the frequency f. The chart 632 is a clock at the frequency f/4. The chart 633 is another clock at f/4, which is shifted by half a period of f (2/f) from the chart 632. The chart 634 is another clock at f/4, which is shifted by 8/f from the chart 632. The chart 635 is a narrow pulse clock of order 4, generated by the narrow clock source 500 when m=4.

FIG. 7 represents waveforms of optical signals. FIG. 7A represents a simulated waveform of the output lightwave signal 102 of the carver 100 represented on FIG. 1, for the carving index n equal to 4 and for the signal baud rate f equal to 28 Gbaud. The amplitude is carved by the modulator 110 when the signals are equal to those represented on the time chart shown in FIG. 6A. The input lightwave signal 101 is 56 Gbit/s QPSK modulated, and its simulated waveform is represented for reference on FIG. 7D. Symbols 701 and 702 are temporally symbols carved as pulses with a pulse width equal to the symbol period and a pulse duty of 33%. The rising edge 703 of the following symbol is also carved in a pulse shape similar to the symbol 701. However, the pulse shaping constraint on the amplitude of the transition between the two symbols 704 following the symbols 701 and 702 is released. The falling edge of the symbol after the unconstrained transition is carved in a pulse shape similar to the symbol 701. The following train of 4 (=n) symbols is shaped in the same manner.

FIG. 7B represents a simulated waveform of the output lightwave signal 202 of the carver 200 represented on FIG. 2, for the carving index n equal to 4 and for the signal baud rate f equal to 28 Gbaud. The amplitude is carved by the modulator 210 when the signals are equal to those represented on the time chart shown in FIG. 6B. The input lightwave signal 201 is 56 Gbit/s QPSK modulated, and its simulated waveform is represented for reference on FIG. 7D. Symbols 711 and 712 are temporally symbols carved as pulses with a pulse width equal to the symbol period and a pulse duty of 66%. The rising edge 713 of the following symbol is also carved in a pulse shape similar to the symbol 711. However, the pulse shaping constraint on the amplitude of the transition between the two symbols 714 following the symbols 711 and 712 is released. The falling edge of the symbol after the unconstrained transition is carved in a pulse shape similar to the symbol 711. The following train of 4 (=n) symbols is shaped in the same manner.

FIG. 7C represents a simulated waveform of the output lightwave signal 302 of the carver 300 represented on FIG. 3, for the carving index n equal to 4 and for the signal baud rate f equal to 28 Gbaud. The amplitude is carved by the modulator 310 when the signals are equal to those represented on the time chart shown in FIG. 6C. The input lightwave signal 301 is 56 Gbit/s QPSK modulated, and its simulated waveform is represented for reference on FIG. 7D. Symbols 721 and 722 are temporally symbols carved as pulses with a pulse width equal to the symbol period and a pulse duty of 50%. The rising edge 723 of the following symbol is also carved in a pulse shape similar to the symbol 721. However, the pulse shaping constraint on the amplitude of the transition between the two symbols 724 following the symbols 721 and 722 is released. The falling edge of the symbol after the unconstrained transition is carved in a pulse shape similar to the symbol 721. The following train of 4 (=n) symbols is shaped in the same manner.

Figure 7D:
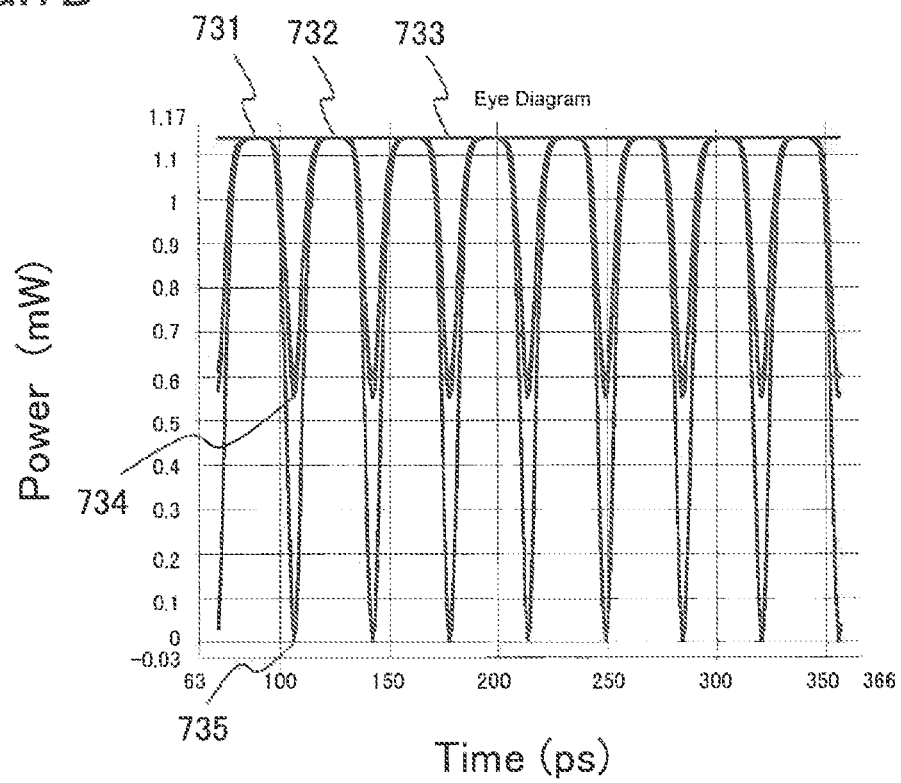

FIG. 7D is a simulated waveform of a 28 Gbaud QPSK signal. Symbols 731 and 732 are consecutive symbols and the amplitude of the transition between these symbols can take three different values depending on the case of phase difference between the consecutive symbols. In the case of the amplitude 733, the consecutive symbols have the same phase value encoded. In the case of the amplitude 734, the absolute phase difference between the consecutive symbols is $\pi/4$ radians. In the case of the amplitude 735, the absolute phase difference between the consecutive symbols is $\pi/2$ radians.

Figure 8A:
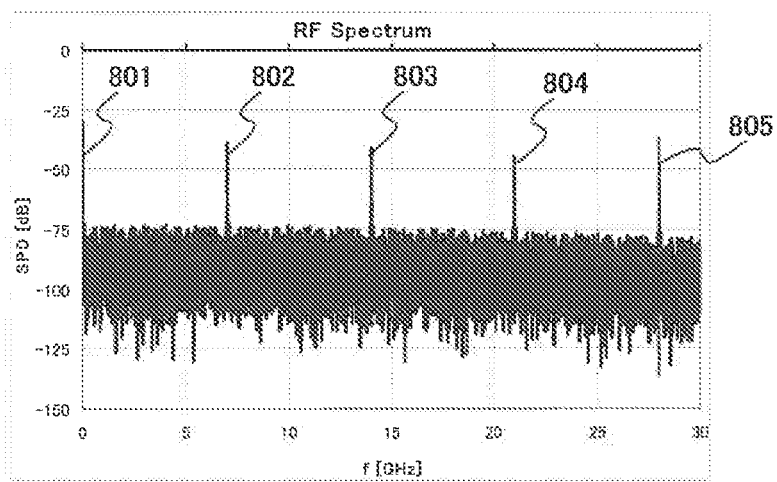
[FIG. 8] 8A is a simulated RF power spectrum of the output lightwave signal of the carver represented on FIG. 1, 8B is a simulated RF power spectrum of the output lightwave signal of the carver represented on FIG. 2, and 8C is a simulated RF power spectrum of the output lightwave signal of the carver represented on FIG. 3.

FIG. 8 represents RF power spectra of the amplitude of optical signals carved according to the present embodiment. FIG. 8A represents a simulated RF power spectrum of the output lightwave signal 102 of the carver 100 represented on FIG. 1, for the carving index n equal to 4 and for the signal baud rate f equal to 28 Gbaud. The amplitude is carved by the modulator 110 when the signals are equal to those represented on the time chart shown in FIG. 6A and the output waveform is represented shown in FIG. 7A. The input lightwave signal 101 is 56 Gbit/s QPSK modulated, and its simulated waveform is represented for reference shown in FIG. 7D. The frequency component 801 is the continuous (null) frequency spectral power density. The frequency component 805 is the spectral power density for the symbol rate.

The frequency component 802 is the spectral power density at the frequency f/n, that is, 7 GHz in the case of this simulation. The frequency component 802 at 7 GHz is more than 35 dB higher than the rest of the spectrum around this value. Accordingly, this spectral component can be extracted easily with analog band pass filters or by computation on digital signal processing of the received signal. Moreover, the frequency component 802 can be extracted in conditions of lower OSNR (Optical Signal to Noise Ratio). The frequency components 803 and 804 represent the following harmonics, which show strong spectral power density of more than 30 dB higher than neighboring spectral areas. These components can also be extracted because the temporal monitoring range that they offer will be significantly lower than the one of the frequency component 805. It is obvious that the carver 100 is different from RZ carving, since there is information imprinted on lower frequency and therefore the carver 100 offers more tolerance of a monitoring signal to dispersion effects. It is also obvious that the carver 100 is different from a tone imprinting scheme, since there is more than one frequency component imprinted on the signal and the lowest frequency component has a strong value without degradation of the modulated signal.

Figure 8B:
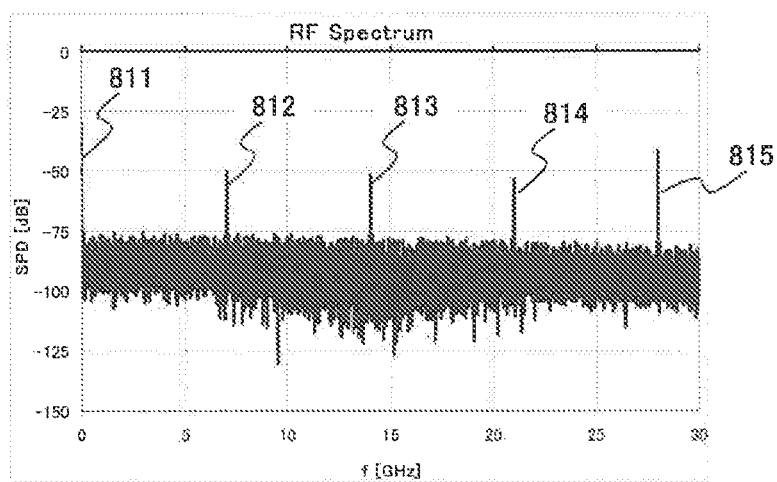

FIG. 8B represents the simulated RF power spectrum of the output lightwave signal 202 of the carver 200 represented on FIG. 2, for the carving index n equal to 4 and for the signal baud rate f equal to 28 Gbaud. The amplitude is carved by the modulator 210 when the signals are equal to those represented on the time chart shown in FIG. 6B and the output waveform is represented on FIG. 7B. The input lightwave signal 201 is 56 Gbit/s QPSK modulated, and its simulated waveform is represented for reference on FIG. 7D. The frequency component 811 is the continuous (null) frequency spectral power density. The frequency component 815 is the spectral power density for the symbol rate.

The frequency component 812 is the spectral power density at the frequency f/n, that is, 7 GHz in the case of this simulation. The frequency component 812 at 7 GHz is more than 25 dB higher than the rest of the spectrum around this value. Accordingly, this spectral component can be extracted easily with analog band pass filters or by computation on digital signal processing of the received signal. Moreover, the spectral component can be extracted in conditions of lower OSNR. The frequency components 813 and 814 represent the following harmonics, which show strong spectral power density of more than 25 dB higher than neighboring spectral areas. The RF spectrum of the signal carved by the carver 200 has similar properties to the RF spectrum of the signal carved by the carver 100.

Figure 8C:
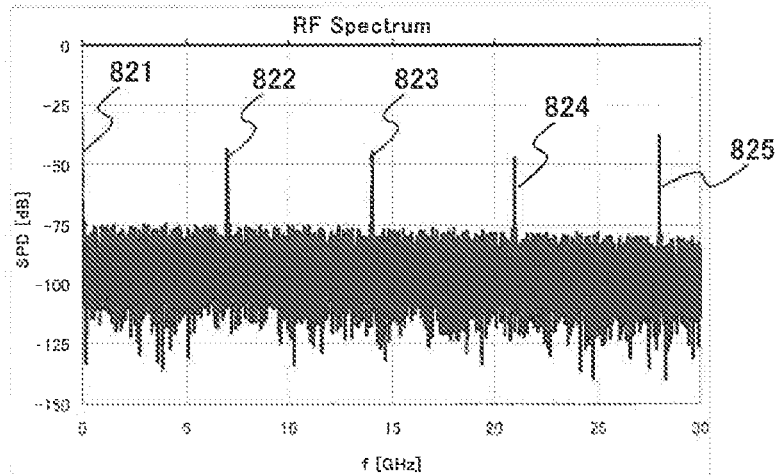

FIG. 8C represents the simulated RF power spectrum of the output lightwave signal 302 of the carver 300 represented on FIG. 3, for the carving index n equal to 4 and for the signal baud rate f equal to 28 Gbaud. The amplitude is carved by the modulator 310 when the signals are equal to those represented on the time chart shown in FIG. 6C and the output waveform is represented on FIG. 7C. The input lightwave signal 301 is 56 Gbit/s QPSK modulated, and its simulated waveform is represented for reference on FIG. 7D. The frequency component 821 is the continuous (null) frequency spectral power density. The frequency component 825 is the spectral power density for the symbol rate.

The frequency component 822 is the spectral power density at the frequency f/n, that is, 7 GHz in the case of this simulation. The frequency component 822 at 7 GHz is more than 35 dB higher than the rest of the spectrum around this value. Accordingly, this spectral component can be extracted easily with analog band pass filters or by computation on digital signal processing of the received signal. Moreover, the spectral component can be extracted in conditions of lower OSNR. The frequency components 823 and 824 represent the following harmonics, which show strong spectral power density of more than 30 dB higher than neighboring spectral areas. The RF spectrum of the signal carved by the carver 300 has similar properties to the RF spectrum of the signal carved by the carver 100.

[Second Exemplary Embodiment]

Figure 9:
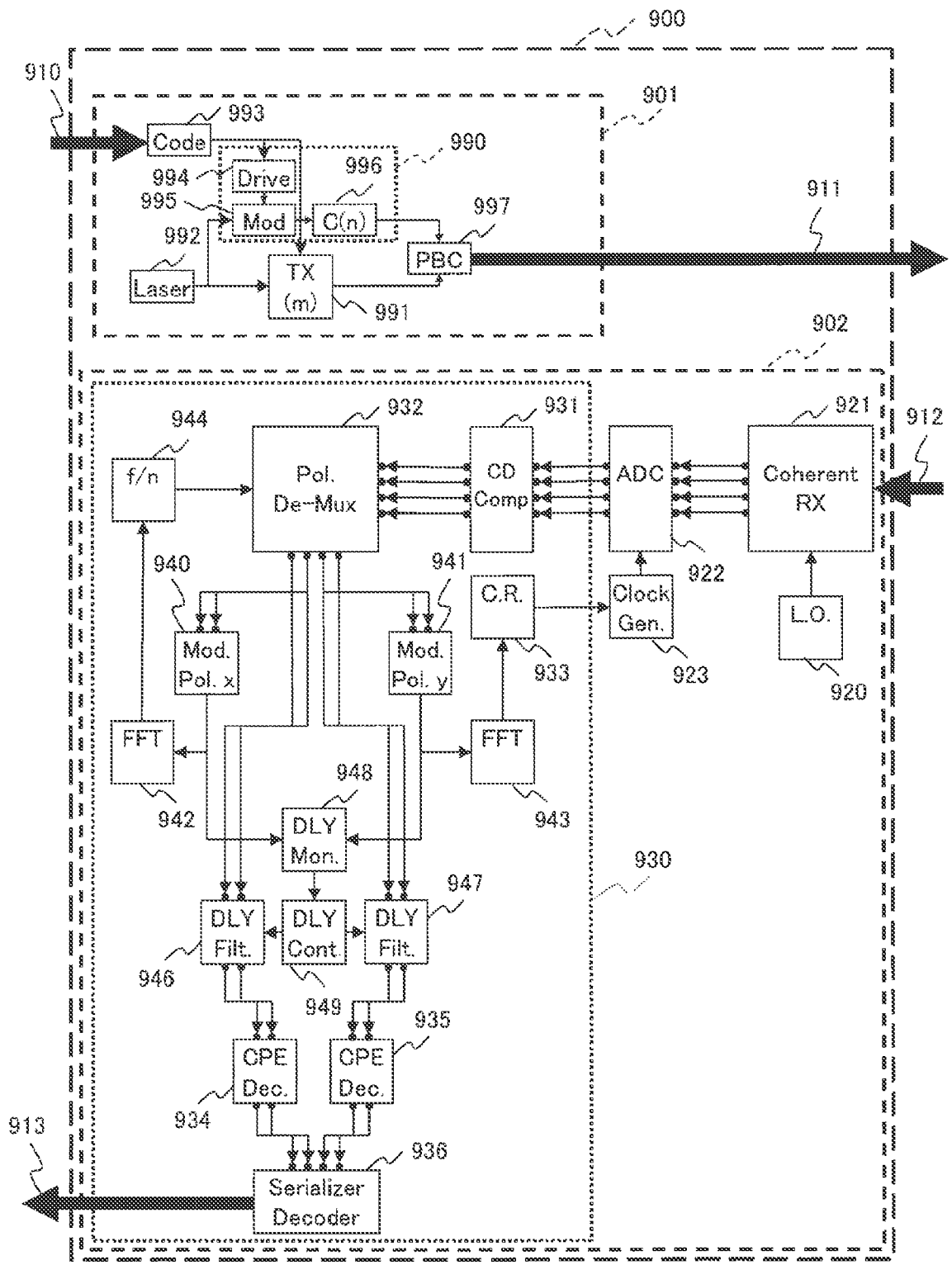
[FIG. 9]

FIG. 9 is a schematic representation of the implementation of a transponder included in the optical communication system with monitor functions according to the present embodiment. A transponder 900 is a polarization multiplexed QPSK (Quadrature-Pphase-Shift-Keying) transponder. The transponder 900 has an optical transmitter 901 and an optical receiver 902.

The optical transmitter 901 is provided with a laser 992 emitting the light, which is modulated on one side by a subsystem 990. The subsystem 990 is provided with the QPSK modulator 995, which modulates the light coming from the laser 992. The QPSK modulator 995 is driven according to the voltage output of a driver 994. After modulation, a carver 996 carves pulses on the optical signal according to the first exemplary embodiment, where the carving index is n. The carver 996 can be identical to one of the carvers shown in FIG. 1, FIG. 2, and FIG. 3. On the other side, the subsystem 991 is identical to the subsystem 990 except that the carver has a carving index m. The integer n and m can be equal or different from each other. The outputs of the subsystems 990 and 991 are polarization multiplexed by a polarization beam combiner 997. An input data stream 910 is 112 Gbit/s data stream, which is de-serialized and coded by a coder 993. The coder 993 distributes tributary data streams to the driver 994 and to a driver inside the subsystem 991.

An emitted lightwave signal 911 is a PDM-QPSK (Polarization-Division-Multiplexed QPSK) signal at 112 Gb/s modulated according to the input data steam 910. The baud rate of the emitted lightwave signal 911 is 28 Gbaud. Each polarization of the emitted lightwave signal 911 is shaped according to the present embodiment with indices n and m. The optical transmitter 901 transmits the lightwave signal 911 through an optical fiber.

The optical receiver 902 receives the optical signal 912, which is a PDM-QPSK signal at 112 Gb/s with pulses shaped on each polarization according to the present embodiment. The optical receiver 902 monitors the transmission skew between multiplexed polarizations of the optical signal 912 and compensates it. The optical receiver 902 decodes and re-serializes the tributary signals into the 112 Gbit/s data stream 913.

Now, an example of operation of the optical receiver 902 is explained. A coherent receiver 921 receives the optical signal 912, mixes it with the light of the laser used as a local oscillator 920, and converts the lightwave signal into four electrical signals. The coherent receiver 921 consists in two 90° hybrids mounted in a polarization diversity scheme, their output being connected to four differential photodiodes, each of them connected to an amplifier. The output signals of the coherent receiver 921 are converted into four digital signals by an Analog to Digital Converter (ADC) unit 922 operating at 2 samples by symbol per signal. The resulting four digital signals are transmitted to a processing unit 930.

First, the digital signal is filtered by Finite Impulse Response (FIR) filters 931, which compensate for the chromatic dispersion (CD) encountered on the transmission link. The polarizations of the received signal, noted Polarization X and Polarization Y, are then demultiplexed in a De-Mux unit 932 based on Constant Modulus Algorithm (CMA) which is used to update butterfly FIR filters. Polarization mode dispersion (PMD) encountered on the link is compensated in the process, but the skew between Polarization X and Polarization Y cannot be compensated because CMA is a blind equalization.

The complex signal of Polarization X is then processed by a modulus unit 940 to calculate its squared modulus, which reflects the properties of the optical amplitude of the received signal. The spectrum of the squared modulus is calculated by Fast Fourier Transform (FFT) in a FFT unit 942 and the result is analyzed by an f/n unit 944, which looks for a component at f/n in order to check if Polarization X is the signal which has a shape with an index n according to the present embodiment. Polarizations X and Y can be identified if the modulation indices n and m are different.

If the signals of X and Y, which are retrieved by CMA at the De-Mux unit 932, are inversed, the f/n unit 944 can not find the f/n component. Then, the f/n unit 944 orders to the De-Mux unit 932 to invert the outputs of both retrieved polarization signals by reversing the order of the coefficients of the FIR filters in the De-Mux unit 932. The use of the component at f/n to identify the signals enables to reduce the identification cases of a prefix or training pattern incorporated in the transmitted light signal.

In a similar manner, the square modulus of Polarization Y is calculated by a modulus unit 941, and its spectrum is analyzed by a FFT unit 943. The component at f/m can be used to retime the data in a clock generator 923. The output of a clock recovery unit 933 is then used by the clock generator 923 to generate the clock signal for the timing of the ADC unit 922. The component at f/m is used for clock recovery in the processing unit 930 as modest processing resource.

A delay monitor unit 948 analyzes the square modulus of Polarization X and Polarization Y and calculates relative phase between extracted frequency components. This phase difference reflects the skew between Polarization X and Polarization Y. The delay monitor unit 948 calculates the link skew between the multiplexed polarizations of the emitted lightwave signal 911 which is emitted to the coherent receiver 921.

A delay controller 949 controls delay filtering units 946 and 947. The delay filtering units 946 and 947 respectively filter Polarization X and Polarization Y with buffers and interpolation filters in order to compensate the skew between Polarization X and Polarization Y. CPE/Decision units 934 and 935 compensate for the deviation of the optical frequency of the local oscillator 920 from the frequency of the optical signal 912. The CPE/Decision units 934 and 935 use a Carrier Phase Estimation (CPE) method and decide for the symbol detected respectively for Polarization X and Polarization Y. A serialize/decode unit 936 serializes and decodes the signals of the multiplexed polarizations X and Y. The serialize/decode unit 936 outputs the 112 Gbit/s data stream 913.

Next, an example of the operation is explained. The baud rate of the emitted lightwave signal 911 and the optical signal 912 is 28 Gbaud, therefore the symbol period is 35.7 ps. According to design, the link skew between transponders is less than 70 ps. Therefore, we chose n=4 and m=8. In this case, we can detect a skew of ±2 symbol periods, i.e. ±71.4 ps between Polarization X and Polarization Y. The carver 996 carves pulses according to the first embodiment with an index 4, using the carver described on FIG. 3. The subsystem 991 implements an identical carver with an index m=8. On the optical receiver 902, the f/n unit 944 analyzes the f/n component, i.e. the frequency component at 7 GHz of the spectrum computed by the FFT unit 942. Identically, the clock recovery unit 933 generates a clock from the f/m component, i.e. the frequency component at 3.5 GHz of the spectrum calculated by the FFT unit 943.

The link skew between Polarization X and Polarization Y has been compensated by the optical receiver using the monitoring information of the present embodiment. Therefore, the optical signal 912 has been correctly received and converted into the data stream 913. In addition, the present embodiment enables the clock recovery of the received signal and the distinction between the Polarization X and the Polarization Y, fulfilling the requirement of moderate processing and power consumption. The monitoring of skew does not necessitate either the information of upper layers or the implementation of a training sequence. In addition, the emitted lightwave signal 911 can be received with an excellent sensitivity and is able to be transmitted at longer reach.

The subsystems 990 and 991 can be replaced with the subsystem 400 shown in FIG. 4. The operator changes the integer n and m during operation. During the transmission, in a first step, n and m can be set to be large integers, so that the monitoring range is very wide; in a second phase, n and m can be reduced to monitor on narrower ranges. In that case, the f/n unit 944 and the delay monitor unit 948 are able to adapt their operation to the change of n and m.

[Third Exemplary Embodiment]

Figure 10:
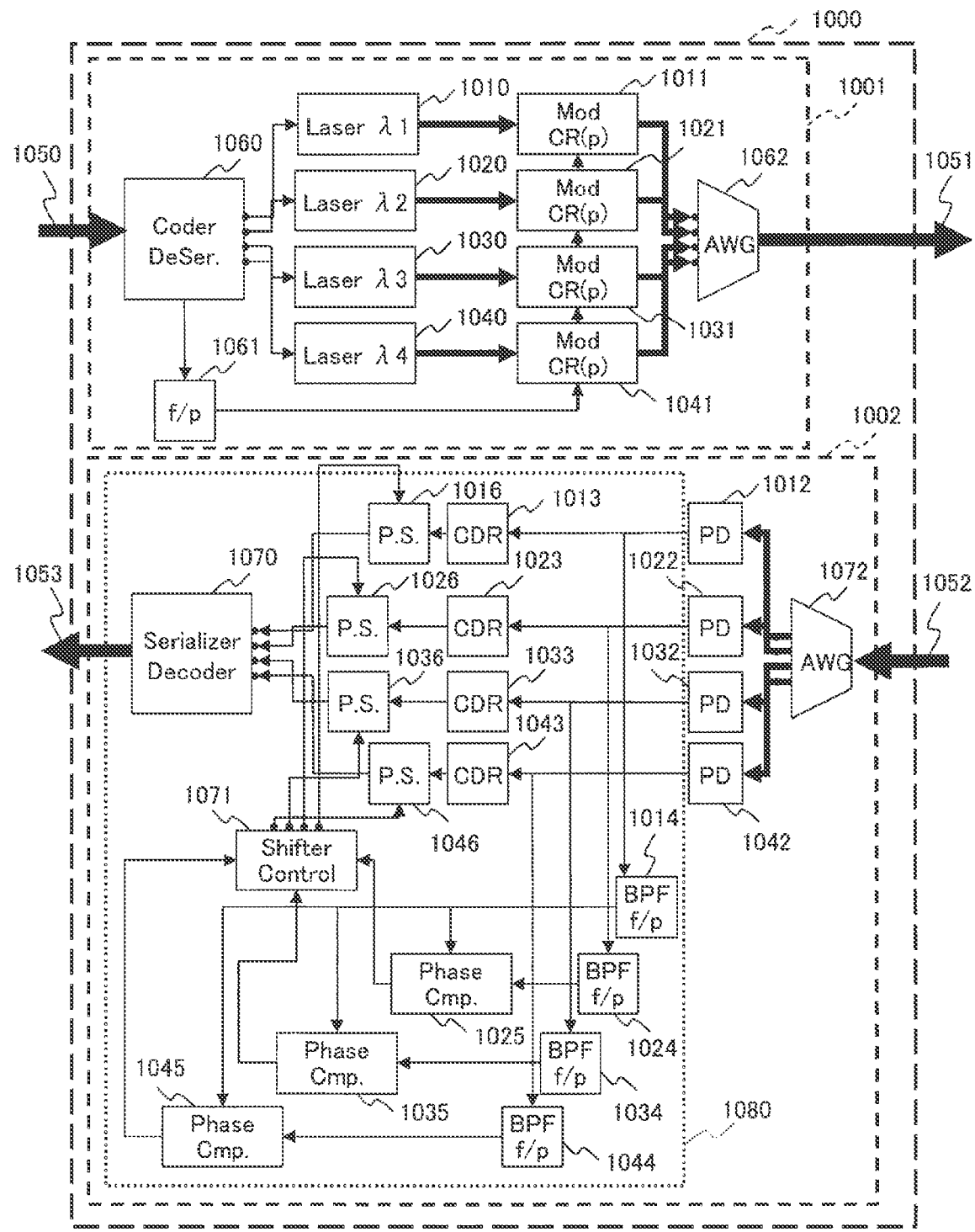
[FIG. 10]

FIG. 10 is a schematic representation of the implementation of a transponder included in the optical communication system with monitor functions according to the present embodiment. A transponder 1000 is a Wavelength Division Multiplexing (WDM) transponder. The transponder 1000 has an optical transmitter 1001 and an optical receiver 1002. The optical transmitter 1001 transmits a high bit rate data stream 1050 on four parallel signals at four different wavelengths. Each bit rate of the parallel signals is four times lower than that of the high bit rate data stream 1050.

The optical receiver 1002 receives four parallel signals of four different wavelengths emitted by the optical transmitter 1001 and serializes them into the serial data stream 1053. The optical transmitter 1001 emits four parallel WDM signals 1051. The optical receiver 1002 receives four parallel WDM signals 1052. The bit rates of the high bit rate data stream 1050 and the serial data stream 1053 are equal.

The coder/de-serializer 1060 splits the high bit rate data stream 1050 into four parallel signals. Each of the four parallel signals is sent to a modulator integrated laser 1010, 1020, 1030 and 1040, respectively. Each of the lasers emits continuous wave (CW) signal with a different wavelength. The signals are modulated with On Off Keying (OOK) format and carved with index p by a carver inside subsystems 1011, 1021, 1031 and 1041. Each of the subsystems is identical to the subsystem 990 shown in FIG. 9, which has a driver, a modulator and a carver apparatus.

A frequency divider 1061 divides the frequency f by p (for instance, p=4). The frequency f is one fourth of the bit rate of the coder/de-serializer 1060. A clock signal at frequency f has a frequency of f/p. The clock signal at f/p is distributed to the subsystems 1011, 1021, 1031 and 1041. A wavelength multiplexer 1062 combines the four intensity modulated signals into the WDM signal 1051. The optical transmitter 1001 transmits the WDM signal 1051 through an optical fiber.

A polarization de-multiplexer 1072 separates the four parallel WDM signals 1052 into four monochromatic signals. The four signals are received by photodiodes 1012, 1022, 1032 and 1042. Each of the electrical signals generated by the photodiodes corresponds to one of photoelectrical conversion signals of the four parallel WDM signals 1052. The four electrical signals are transmitted to a processing unit 1080. Clock and Data Recovery (CDR) units 1013, 1023, 1033 and 1043 decode these electrical signals. The band pass filter 1014 has a center frequency f/p. The frequency component at f/p is imprinted by carving at index p according to the present embodiment. Therefore, the clock signal at f/p in the output of the band pass filter 1014 contains the information of the carving. Band pass filters 1024, 1034 and 1044 are identical to the band pass filter 1014 and operate in the same way on the signals from the photodiodes 1022, 1032 and 1042 respectively.

Each of phase comparators 1025, 1035 and 1045 includes a XOR logical gate and produces a voltage which is proportional to the phase difference between the clock signals at f/p, which are used as its input data. The phase comparators compare the phase difference between the clock signal from the band pass filter 1014 and the respective clock signals from the band pass filter 1024, 1034 and 1044. The electrical signals proportional to the phase delay between the clock signals generated by the phase comparators 1025, 1035 and 1045 are sent to the phase shifter control unit 1071. An example of the results of the phase comparator 1025 is given on FIG. 13A.

The phase shifter control unit 1071 generates four electrical signals to control the four variable phase shifters 1016, 1026, 1036 and 1046, which are placed on the path of the data received by the respective photodiodes 1012, 1022, 1032 and 1042. The phase shifter control unit 1071 controls the phase shifters to compensate the skew between the four received wavelengths, which is monitored through the phase delay between the clock signals at f/p generated through the four band pass filters. The phase shifter control unit 1071 is calibrated so that the four phase shifters introduce the same delay when the four received wavelength have no skew. A serializer/decoder 1070 transforms the four parallel signals with compensated skew into the serial data stream 1053.

The link skew between the four wavelengths has been compensated by the optical receiver 1002 using the monitoring information of the present embodiment. Therefore, the four parallel WDM signals 1052 has been correctly received and converted into the serial data stream 1053. The skew compensation scheme is limited to the physical layer, with fast and stable feedback on the skew between multiplexed channels. Because the skew compensation does not necessitate any header or training sequence, the constant bit rate is maintained. Furthermore, the four parallel WDM signals 1051 have an excellent quality factor and can be transmitted through long distances.

[Fourth Exemplary Embodiment]

Figure 11:
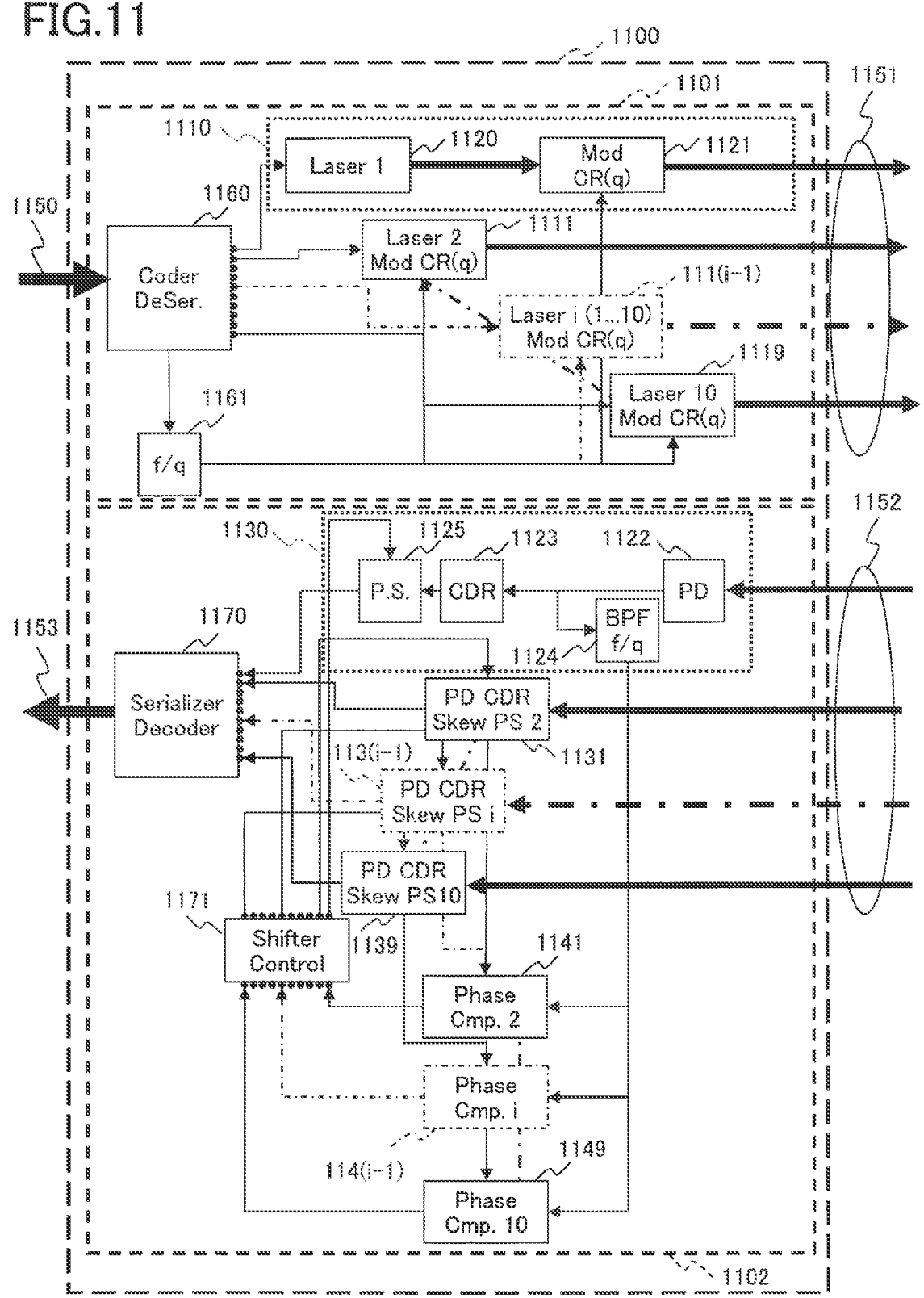
[FIG. 11]

FIG. 11 is a schematic representation of the implementation of a transponder included in the optical communication system with monitor functions according to the present embodiment. A transponder 1100 is a Space Division Multiplexing (SDM) transponder. The transponder 1100 has an optical transmitter 1101 and an optical receiver 1102. The optical transmitter 1101 transmits high bit rate data stream 1150 on ten parallel signals, whose bit rate are ten times lower than the high bit rate data stream 1150. The ten parallel signals are transmitted through ten different optical fibers which are attached in the fiber ribbon 1151.

The optical receiver 1102 receives the ten parallel signals through fibers attached in the fiber ribbon 1152 which are emitted by a transmitter 1101. The optical receiver 1102 serializes the ten parallel signals into a serial data stream 1153. The bit rates of the high bit rate data stream 1150 and the serial data stream 1153 are equal. The bit rate of the parallel signals transmitted in the fiber ribbon 1151 is equal to the bit rate of the parallel signals transmitted in the fiber ribbon 1152. Each bit rate of the parallel signals is one tenth of the bit rate of the high bit rate data stream 1150.

The coder/de-serializer 1160 splits the high bit rate data stream 1150 into ten parallel signals. The emitter 1110 includes a laser 1120 and a subsystem 1121. Optical intensity of the laser 1120 is modulated with one of the parallel signal from the coder/de-serializer 1160. The subsystem 1121 is identical to the subsystem 1011 shown in FIG. 10, and includes an OOK modulator and a carver which shapes the optical signal with an index q according to the first embodiment. A frequency divider 1161 transforms the clock data at frequency f into a clock signal at the frequency f/q. The frequency f is one tenth of the bit rate of the high bit rate data stream 1150. The clock signal at the frequency f/q is fed to the subsystem 1121.

The emitter 1110 emits one optical signal modulated by the parallel signal from the coder/de-serializer 1160 into the fiber ribbon 1151. The other nine emitters, noted by the consecutive numbers from 1111 to 1119, are identical to the emitter

1110. Each of the other nine emitters transmits nine parallel intensity modulated signals into the nine remaining fibers of the ribbon 1151. The amplitude of the parallel intensity modulated signals is carved with an index q according to the first embodiment. The parallel intensity modulated signals contain the information of the parallel signals from the coder/de-serializer 1160.

A skew compensation receiver unit 1130 includes a photodiode 1122, a CDR 1123, a band pass filter 1124 having a center frequency f/q, and a variable phase shifter 1125. The photodiode 1122 converts the optical signal from one of the fibers in the fiber ribbon 1152 into an electrical signal. The electrical signal is split in two signals. One signal is send to the CDR 1123 and is converted to electrical data. The other signal is filtered by the band pass filter 1124. The band pass filter 1124 generates a clock signal at f/q and its harmonic which are contained in the optical signal imprinted by the carving scheme according to the first embodiment. The phase shifter 1125 shifts the data from the CDR 1123 and is controlled by a control unit 1171.

The other nine parallel signals transmitted by the fiber ribbon 1152 are received by the nine skew compensation receivers unit noted by the nine consecutive numbers from 1131 to 1139, which are identical to the skew compensation receiver unit 1130. Nine phase comparators noted from 1141 to 1149 compare the phase difference between the clock signal at f/q outputted by the skew compensation receiver unit 1130 and the respective clock signals coming from 1131 to 1149. The electrical signals proportional to the phase delay between the clock signals generated by the nine phase comparators 1141 to 1149 are sent to a phase shifter control unit 1171. The phase shifter control unit 1171 generates ten electrical signals to control the ten phase shifters of the skew compensation receiver units 1130 to 1139.

The phase shifter control unit 1171 controls the phase shifters to compensate the skew between the ten received signals. The skew is monitored through the phase delays between the clock signals at f/q generated by the band pass filters of the skew compensation receiver units 1130 to 1139. The phase shifter control unit 1171 is calibrated so that the ten phase shifters introduce the same delay when the received parallel signals have no skew. A serializer/decoder 1170 transforms these ten parallel signals with compensated skew into the serial data stream 1153.

The link skew between these ten parallel signals has been compensated by the optical receiver 1102 using the monitoring information of the present embodiment. Therefore, the data through the fiber ribbon 1152 have been correctly received and converted into the serial data stream 1153. The skew compensation scheme is limited to the physical layer, with fast and stable feedback on the skew between multiplexed channels. Because the skew compensation does not necessitate any header or training sequence, the constant bit rate is maintained. Furthermore, the signal through the fiber ribbon 1151 has an excellent quality factor and can be transmitted through long distances.

[Fifth Exemplary Embodiment]

Figure 12:
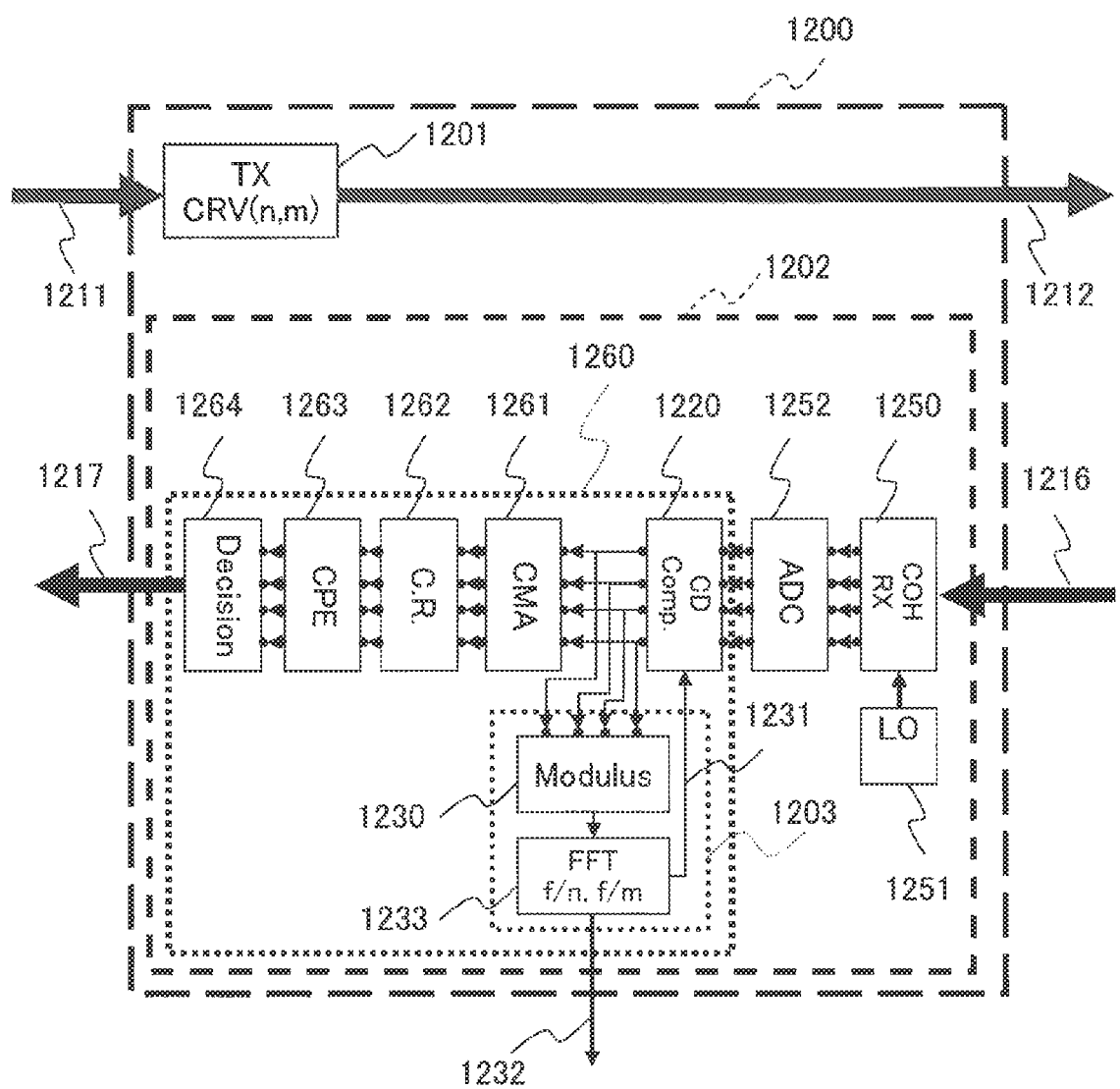
[FIG. 12]

FIG. 12 is a schematic representation of the implementation of a transponder included in the optical communication system with monitor functions according to the present embodiment. A transponder 1200 is a polarization division multiplexed QPSK (PDM-QPSK) transponder. The transponder 1200 has an optical transmitter 1201 and an optical receiver 1202. The optical transmitter 1201 is identical to the optical transmitter 901 shown in FIG. 9. The optical transmitter 1201 modulates a lightwave with a data stream 1211 which is 112 Gbit/s data stream. Subsequently, the optical transmitter 1201 emits a lightwave signal 1212 which is a PDM-QPSK signal at 112 Gbit/s. The baud rate of the lightwave signal 1212 is 28 Gbaud. Each polarized lightwave of the lightwave signal 1212 is shaped according to the first embodiment with indices n and m. The integer n and m can be equal or different.

The receiver 1202 receives an optical signal 1216 which is a PDM-QPSK signal at 112 Gbit/s. The optical signal 1216 includes the pulses shaped on each polarized lightwave according to the first embodiment. The receiver 1202 monitors the residual chromatic dispersion (CD) of the received signal and compensates it. Then, the receiver 1202 decodes and re-serializes the tributary signals into the 112 Gbit/s data stream 1217.

Next, an example of operation of the receiver 1202 is explained. A coherent receiver 1250 includes two 90° hybrids mounted in a polarization diversity scheme. The outputs of the 90° hybrids are connected to four differential photodiodes, each of which is connected to an amplifier. The coherent receiver 1250 receives the optical signal 1216, mixes it with the light of the laser used as a local oscillator 1251, and converts the lightwave signal into four electrical signals. The output signals of the coherent receiver 1250 are converted into four digital signals by an ADC 1252 operating at 2 samples by symbol per signal.

The resulting four digital signals are transmitted to a processing unit 1260. The digital signal is first filtered by Finite Impulse Response (FIR) filters in a CD compensation unit 1220, which compensate for the chromatic dispersion (CD) encountered on the transmission link. The complex signal at the output of the FIR filters is then processed by a monitoring unit 1203, which monitors the residual CD on the signal using the information carved on the optical signals according to the present embodiment. A feedback signal 1231 is proportional to the residual CD and is fed back to the CD compensation unit 1220. The CD compensation unit 1220 is updated so that the residual CD becomes null. A signal 1232 can be also provided by the transponder 1200 to the operator and enables an external monitoring of the residual CD outside the transponder.

In the monitoring unit 1203, a modulus unit 1230 calculates the squared modulus of the signal after CD compensation. The squared modulus reflects the properties of the optical amplitude of the received and partially compensated signal. The spectrum of the square modulus is calculated by Fast Fourier Transform by a FFT unit 1233. The FFT unit 1233 extracts the amplitude of the frequency components at f/n and f/m, which are imprinted by carving at indices n and m performed according to the present embodiment. The CD compensation unit 1220 adjusts the FIR coefficients so that the monitored components at f/n and f/m reach their minimum value. In this case, the CD is fully compensated and the fine tuning was made possible through the feedback signal 1231 which is calculated from the information imprinted according to the present embodiment.

The polarizations of the received signal, noted Polarization X and Polarization Y, are then demultiplexed in a CMA unit 1261 which is based on Constant Modulus Algorithm (CMA) used to update butterfly FIR filters. The PMD encountered on the link is compensated in this process. The clock signal is recovered by a clock recovery unit 1262 using the Gardner algorithm. A CPE unit 1263 compensates the deviation of the optical frequency and phase from the local oscillator 1251 by using the Carrier Phase Estimation method. A decision unit 1264 decides the detected symbol respectively, serializes the information received for each polarization, and decodes the signals of the multiplexed polarizations X and Y. The receiver 1202 outputs the 112 Gbit/s data stream 1217.

Next, an example of operation is explained. Each baud rate of the lightwave signal 1212 and 1216 is 28 Gbaud. By design, the absolute residual CD after a CD compensation unit 1220 is less than 1500 ps/nm. Therefore, we chose n=4 and m=16. According to the present embodiment, the optical transmitter 1201 carves pulses with indices 4 and 16 by using the carver 200 described on FIG. 2.

On the receiver side, the FFT unit 1233 analyzes the amplitude of the frequency component at f/n i.e. at 7 GHz and the amplitude of the frequency component at f/m i.e. at 1.75 GHz. The monitor signals are illustrated on FIG. 13B. At first, the FFT unit 1233 uses the information on f/16. In this case, according to a monitor signal 1310 on FIG. 13B, the FFT unit 1233 can use the monitoring range of ±1760 ps/nm in order to tune the coefficients of the CD compensation unit 1220 by minimizing the feedback signal 1231. When the monitored residual CD is inside the range of ±300 ps/nm, according to a monitor signal 1320 on FIG. 13B, the information on f/4 can be used for better precision. The coefficients of the CD compensation unit 1220 are set to minimize the feedback signal 1231 in the same process.

In stead of the optical transmitter 1201, the transmitter 400 can be used for carving the lightwave signal. The operator can change the integer n and m during operation. During the transmission, in a first step, n and m can be set to be large integers so that the monitoring range is very wide. In a second phase, n and m can be reduced to monitor on narrower ranges. In this case, the FFT unit 1233 is able to adapt its operation to the change of n and m.

The receiver 1202 has compensated the CD by monitoring the information according to the present embodiment with a wide range even for high bit rate signals. The monitoring range is wider than that of the known methods based on standard RZ carving. Therefore, the optical signal 1216 has been correctly received and converted into the 112 Gbit/s data stream 1217. The CD monitoring scheme is limited to the physical layer with fast and stable feedback of the residual CD. Because the compensation does not necessitate any header or training sequence, the constant bit rate is maintained. Furthermore, the lightwave signal 1212 has an excellent quality factor and can be transmitted through long distances.

Figure 13A:
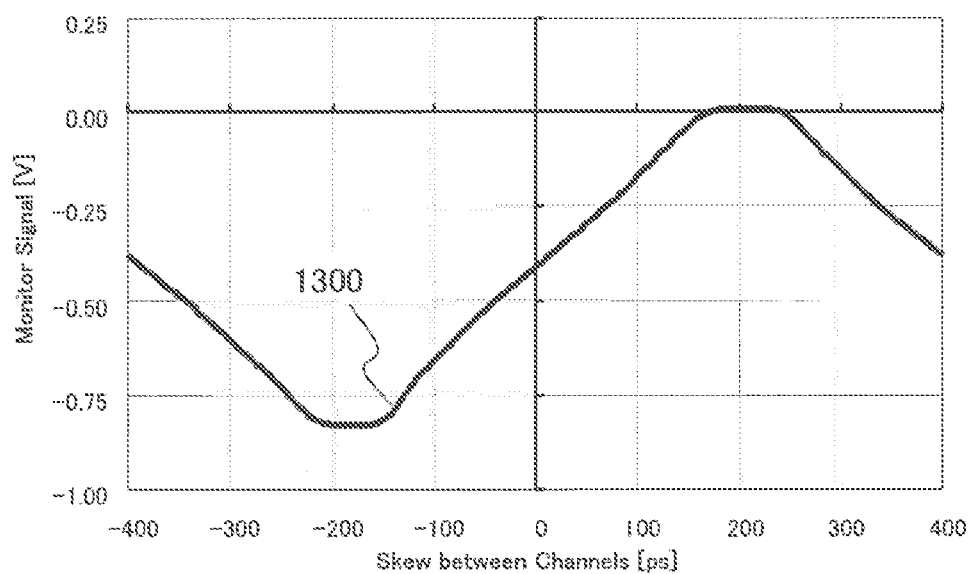
[FIG. 13] 13A is a diagram of the monitor signal according to the fourth exemplary embodiment and 13B is a diagram of the monitor signal according to the fifth exemplary embodiment.

FIG. 13 represents the monitor signals generated by the embodiments. A curve 1300 on FIG. 13A represents the experimental results on a phase detector which detects the phase between clocks extracted from an optical signal. For instance, in the fourth exemplary embodiment (FIG. 11), the emitters 1110 to 1119 emit the SDM signals, each of which has a bit rate of 10 Gb/s and a carving index of q=4. In this case, the curve 1300 on FIG. 13A illustrates the signal which is generated by the phase comparator 1141 and depends on the skew that the signals transmitted in the fiber ribbon 1151 encountered. The extracted clock signals at 2.5 GHz (=f/4) are calibrated and processed through a XOR gate so that the reference voltage corresponds with the zero skew value. The range of ±200 ps corresponds to ±2 symbols period i.e. 4 symbols period wide, which is decided by the carving index 4. Since the monitor signal has the monotone characteristics as shown in FIG. 13A, the feedback system is straight forward.

Figure 13B:
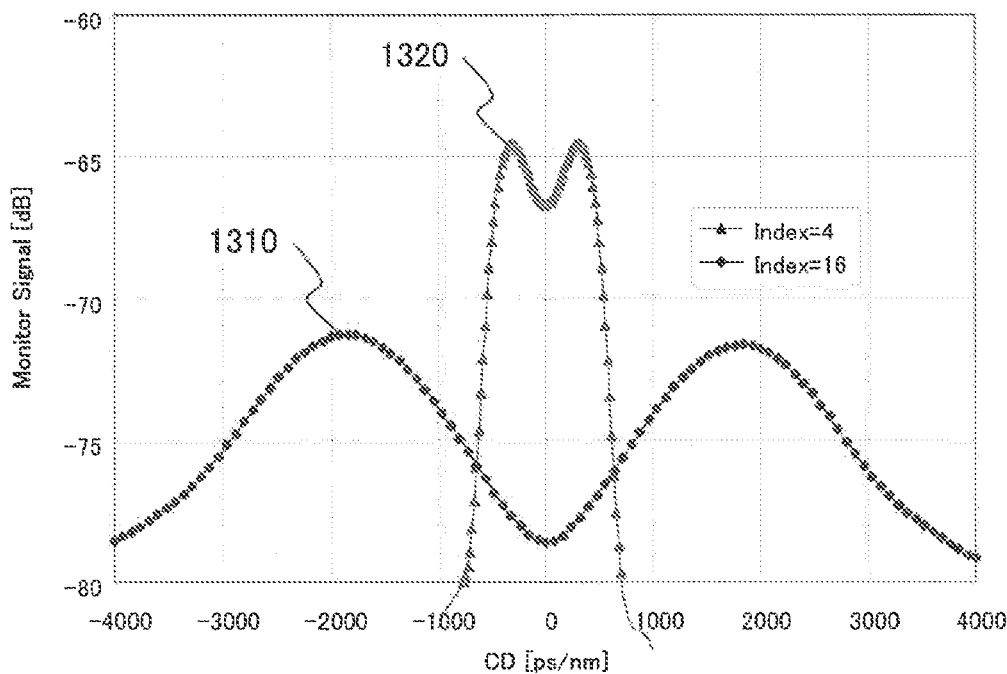

The curves on FIG. 13B represent the results of simulation for the feedback signal 1231 of FIG. 12 on the condition that the lightwave signals 1212 and 1216 are PDM-QPSK at 112 Gb/s and the carving indices n and m are chosen as 4 and 16 respectively. The curve 1310 is the monitor signal calculated by the frequency component at f/16 and the curve 1320 is calculated from the frequency component at f/4. Both curves have a minimum at a null CD. If the range is limited to ±1760 ps/nm or ±300 ps/nm respectively, these curves are monotone on each of the positive and negative region of the CD and are symmetrical about their minimum at 0 ps/nm. Therefore, the feedback to minimize this signal can perfectly compensate the CD in the process.

FIG. 14 is a table containing simulation results of Q factor which results in an identical Optical Signal to Noise Ratio (OSNR) for the signals generated by using the embodiments and for the conventional signals. These results are simulated for 112 Gb/s PDM-QPSK signals with OSNR set to 19 dB/0.1 nm. The setup for this simulation is identical to the transponder 900 in the second embodiment shown in FIG. 9. For a modulation index of 4, the Q factor is found between 10.6 dB and 11 dB depending on the carvers. For a modulation index of 16, the Q factor ranges from 10.7 dB to 11.8 dB depending on the carvers. As a reference, the Q factors are calculated for RZ and NRZ formats without carving and therefore without any usable monitor signal. The Q factors of the transponders according to the embodiments are higher than that of NRZ format and can be very close to that of RZ format.

For comparison, the Q factors of the related transponder implemented by Pseudo-Return-to-Zero (PRZ) format are also simulated. The PRZ format forms monitor signals such as those of the embodiments. However, the Q factors of the PRZ format are similar to those of the NRZ format. Therefore, the Q factors of the PRZ format are substantially lower than those of the embodiments. The improvement of Q factor by the embodiments is partly because the loaded noise can be reduced. That is, since the waveform is sharpened by the embodiments, the symbol is limited in time. Therefore, the quantity of noise superposed to the useful part of the signal can be reduced.

Since the transponders according to the embodiments have higher Q factors on identical conditions, the transponders enlarge the margin on the system design.

Figure 15:
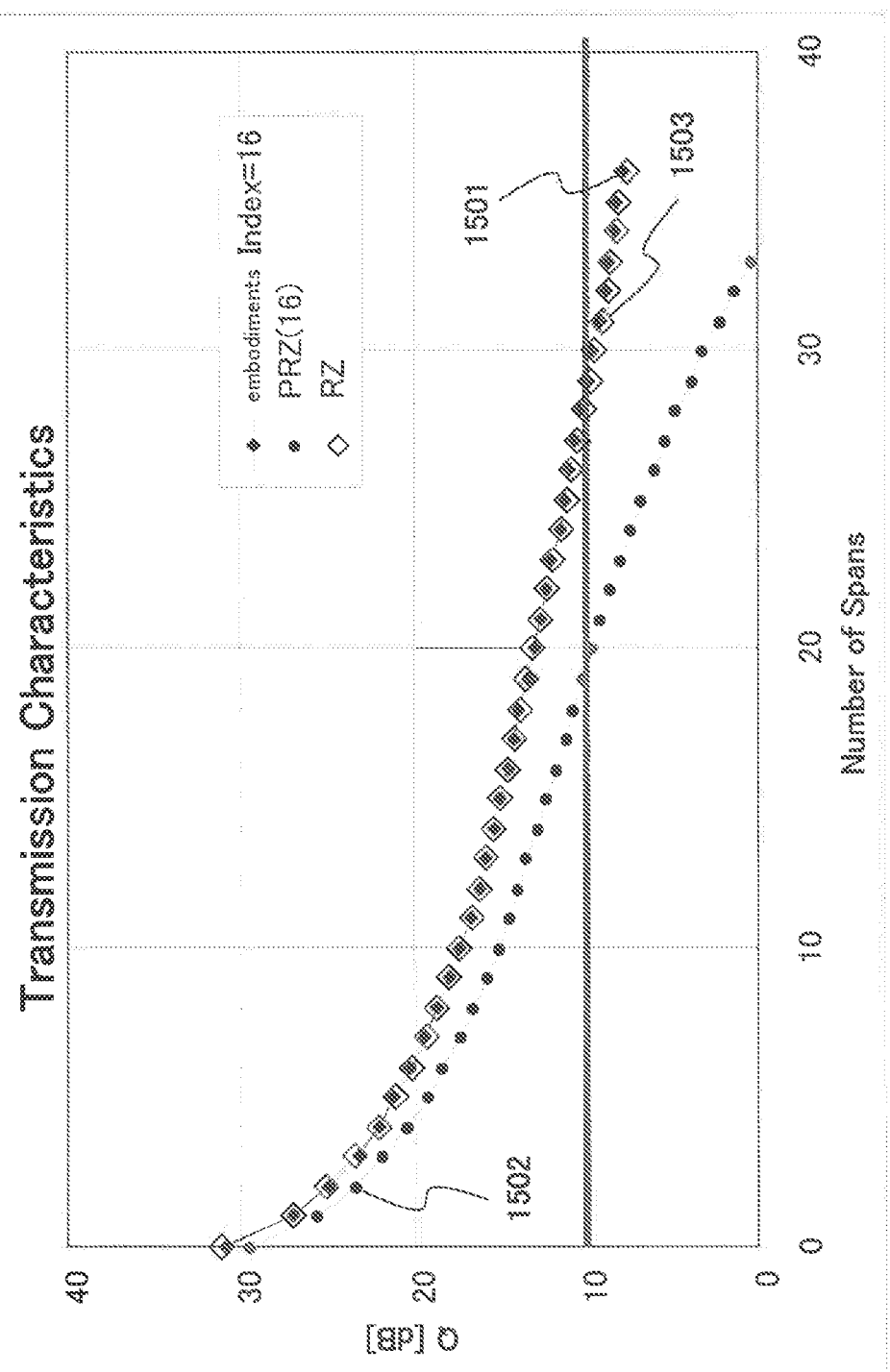
[FIG. 15]

FIG. 15 shows the simulation results of transmission characteristics using the same transponder configuration as that for FIG. 14. The transmission spans are set to 80 km with standard single mode fibers. By setting the system margin to 10 dB for Q limit, a signal 1501 carved according to the embodiment is able to be transmitted for 27 spans, i.e. 2160 km. On the other hand, a related PRZ(16) signal 1502, which also enables monitoring, can be transmitted for only 19 spans, i.e. 1520 km. For comparison, RZ signal 1503 can be transmitted for the same distance as that for the signal 1501. This shows that the signal generated by using the embodiment does not cause any reduction of transmission distance from RZ signal. As mentioned above, according to the embodiments, information can be imprinted on the optical signal, which can be used for monitoring, and the transmission characteristics identical to RZ format signals are achieved.

Figure 16:
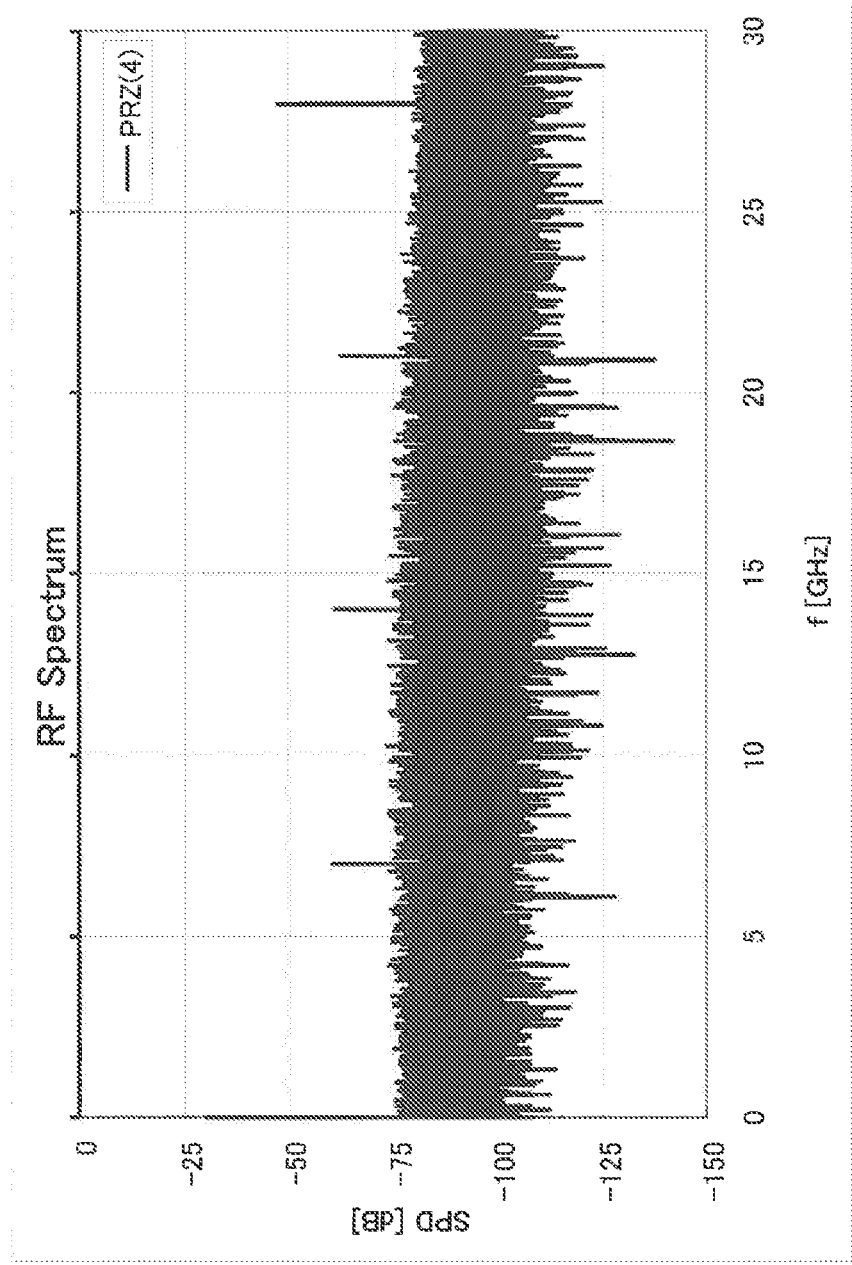
[FIG. 16]

The difference between the embodiments and PRZ is described in greater detail below. FIG. 16 represents the RF power spectrum of the amplitude of an optical signals carved according to related PRZ(4), in which a carving index n is equal to 4 and the signal baud rate f is equal to 28 Gbaud. There is a frequency component at 7 GHz, which is imprinted by PRZ(4) at one-fourth of the baud rate. The spectral power density is more than 15 dB higher than the rest of the spectrum around this value. Accordingly, this spectral component can be extracted easily with analog band pass filters or by computing the received signal using digital signal processing. Moreover, the spectral component can be extracted in conditions of low OSNR. The following harmonics are also imprinted according to PRZ and can also be extracted. Since they have higher frequencies, the temporal monitoring range is significantly lower than the f/4 component.

Comparing FIG. 16 and FIG. 8A to 8C, it is evident that the embodiment enables to imprint a low frequency component, which is more powerful, i.e. surpassing those of PRZ by 8 dB to 18 dB, for the same frequency component at f/4. This significant improvement in power offers more robust monitoring even when the noise level is higher. Moreover, the improvement in imprinted signal power enables an easier extraction of the frequency component. Therefore, this improvement enables the usage of cheaper analog filters or digital processing consuming less resource.

Figure 17:
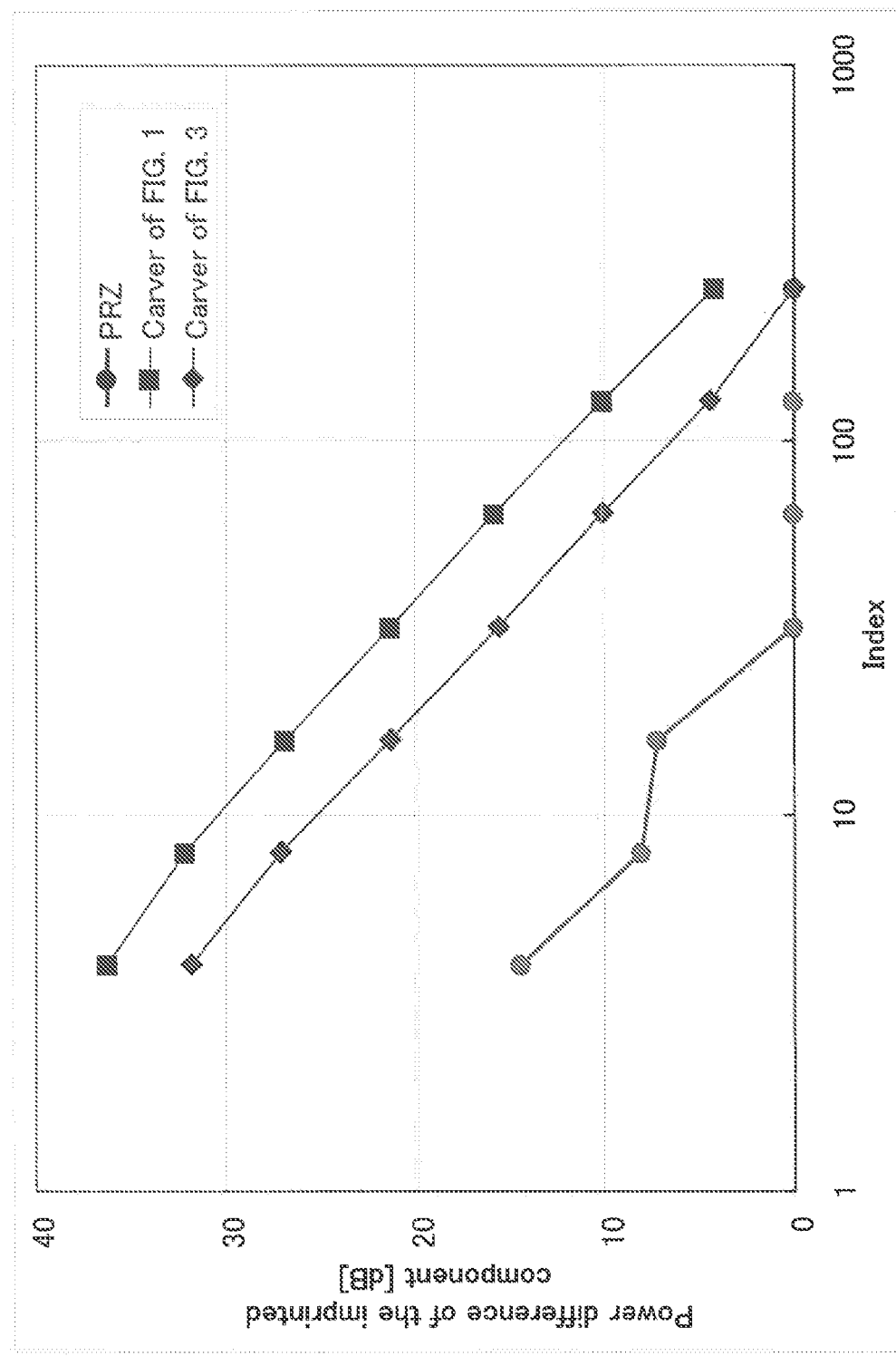
[FIG. 17]

FIG. 17 represents simulation results of the RF power difference of specific frequency components. FIG. 17 shows data for signals carved with the carvers according to the embodiment shown in FIG. 1 and FIG. 3. The modulation indices n ranges from 4 to 256. For each modulation index n, the spectral component is measured at f/n, where f is the baud rate of the simulated QPSK signal at 28 GHz. For comparison, FIG. 17 also shows the data for the same QPSK signal carved with related PRZ(n), where n also ranges from 4 to 256.

FIG. 17 illustrates that the embodiments enable to imprint a low frequency component, which has significantly more power for the same frequency component than that of PRZ. This significant improvement in power offers more robust monitoring even when the noise level is higher. Moreover, the improvement in imprinted signal power enables an easier extraction of the frequency component. Therefore, this improvement enables the usage of cheaper analog filters or digital processing consuming less resource.

In addition, FIG. 17 illustrates that the embodiments enable to imprint the information on the lower component frequencies compared with PRZ. This is because the imprinted frequency component can be distinguished from the surrounding components with even higher modulation indices. Since the monitoring ranges depend on the period of the imprinted low frequency component, the embodiments enable the optical communication systems to monitor the signals on wider ranges compared with PRZ.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary note 1) A method comprising: imprinting frequency components on a signal carrying modulated data by carving the signal wherein the carving is characterized by an index n and is performed on temporally consecutive groups of n symbols where: n−2 symbols are shaped as pulses with a pulse period equal to the symbol period; the temporally following (n−1)th symbol has a rising edge of amplitude, which is carved in a similar pulse manner the constraint on the amplitude during the transition between the (n−1)th symbol and the nth symbol is released so that the amplitude is not affected by carving the amplitude falling edge of the nth symbol is carved in the same shape as the pulses carved between the (n−2) already carved pulses; detecting a frequency component related to the carving methods wherein the frequency component is equal to one nth of the signal symbol rate or to a harmonic frequency of one nth of the signal symbol rate.

(Supplementary note 2) The method of Supplementary note 1, wherein the carving is performed on parallel signals carrying the information of a serial data converted to parallel data wherein detecting the frequency component is performed on each parallel signal wherein the phase of each detected frequency component is compared and the phase difference is related to the skew between parallel signals.

(Supplementary note 3) The method of Supplementary note 2, wherein the index n characterizing the carving is different for each parallel signal and the detected frequency components are converted to be compared.

(Supplementary note 4) The method of Supplementary note 2, wherein the different indices on each parallel signal is used to distinguish the parallel signals.

(Supplementary note 5) The method of claim any of Supplementary notes 1 to 4, wherein the detected frequency component is used to detect chromatic dispersion impairing the signal.

(Supplementary note 6) The method according to any of Supplementary notes 1 to 5, wherein the index n can be changed during operation.

(Supplementary note 7) The method according to any of Supplementary notes 1 to 6, wherein the detected frequency component is used to generate a clock signal.

(Supplementary note 8) The method of any of Supplementary notes 1 to 7, wherein the detected frequency component is used for the processing of the detected signal.

(Supplementary note 9) A system including: an apparatus to imprint frequency components on a signal carrying modulated data by carving the signal wherein the carving is characterized by an index n and is performed on temporally consecutive groups of n symbols where: n−2 symbols are shaped as pulses with a pulse period equal to the symbol period; the temporally following (n−1)th symbol has a rising edge of amplitude, which is carved in a similar pulse manner the constraint on the amplitude during the transition between the (n−1)th symbol and the nth symbol is released so that the amplitude is not affected by carving the amplitude falling edge of the nth symbol is carved in the same shape as the pulses carved between the (n−2) already carved pulses; an apparatus to detect a frequency component related to the carving methods wherein the frequency component is equal to one nth of the signal symbol rate or to a harmonic frequency of one nth of the signal symbol rate.

(Supplementary note 10) The system of Supplementary note 9, wherein the apparatus detecting a frequency component is an analog band pass filter.

(Supplementary note 11) The system of Supplementary note 10, wherein the apparatus detecting a frequency component is a calculation module performing filtering by digital signal processing.

(Supplementary note 12) Any of the systems of Supplementary notes 9 to 11, used on parallel signals carrying the information of a serial data converted to parallel data including: means to compare the phases of extracted frequency components and to generate a signal proportional to the skew between the parallel signals.

(Supplementary note 13) A transponder which emits and receives polarization division multiplexed signals, including the system of any of Supplementary notes 9 to 12 wherein the generated signal is proportional to the skew between the polarization multiplexed signals.

(Supplementary note 14) A transponder which emits and receives wavelength division multiplexed signals, including the system of any of Supplementary notes 9 to 12 wherein the generated signal is proportional to the skew between the wavelength multiplexed signals.

(Supplementary note 15) A transponder which emits and receives space division multiplexed signals, including the system of any of Supplementary notes 9 to 12 wherein the generated signal is proportional to the skew between the polarization multiplexed signals.

(Supplementary note 16) Any of the systems of Supplementary notes 9 to 15, including: means to generate a signal from the amplitude of the detected frequency component, where the signal is proportional to the chromatic dispersion impairing the signal.

(Supplementary note 17) A system to shape a modulated signals wherein the carving is characterized by an index n and is performed on temporally consecutive groups of n symbols where: n−2 symbols are shaped as pulses with a pulse period equal to the symbol period; the temporally following (n−1)th symbol has a rising edge of amplitude, which is carved in a similar pulse manner the constraint on the amplitude during the transition between the (n−1)th symbol and the nth symbol is released so that the amplitude is not affected by carving the amplitude falling edge of the nth symbol is carved in the same shape as the pulses carved between the (n−2) already carved pulses; wherein the system includes a circuit generating a narrow pulse clock wherein the pulses have a duty cycle of 33%.

(Supplementary note 18) A system to shape a modulated signals wherein the carving is characterized by an index n and is performed on temporally consecutive groups of n symbols where: n−2 symbols are shaped as pulses with a pulse period equal to the symbol period; the temporally following (n−1)th symbol has a rising edge of amplitude, which is carved in a similar pulse manner the constraint on the amplitude during the transition between the (n−1)th symbol and the nth symbol is released so that the amplitude is not affected by carving the amplitude falling edge of the nth symbol is carved in the same shape as the pulses carved between the (n−2) already carved pulses; wherein the pulses have a duty cycle of 66%.

(Supplementary note 19) A system to shape a modulated signals wherein the carving is characterized by an index n and is performed on temporally consecutive groups of n symbols where: n−2 symbols are shaped as pulses with a pulse period equal to the symbol period; the temporally following (n−1)th symbol has a rising edge of amplitude, which is carved in a similar pulse manner the constraint on the amplitude during the transition between the (n−1)th symbol and the nth symbol is released so that the amplitude is not affected by carving the amplitude falling edge of the nth symbol is carved in the same shape as the pulses carved between the (n−2) already carved pulses; wherein the system includes a circuit generating a narrow pulse clock wherein the pulses have a duty cycle of 50%.

INDUSTRIAL APPLICABILITY

This invention can be applied to an optical communication system with monitor functions.

Reference Signs List
100, 200, 300, 996 Carver
115, 315 Narrow pulse clock source
116, 216, 316 Clock
400 Transmitter
413, 414 Digital to analog converter (DAC)
500 Narrow clock source
900, 1000, 1100, 1200 Transponder
901, 1001, 1101, 1201 Optical transmitter
902, 1002, 1102, 1202 Optical receiver
921, 1250 Coherent receiver
992 Laser
930, 1080, 1260 Processing unit
995 QPSK modulator

The invention claimed is:

1. A monitoring method for an optical communication system, comprising the steps of:
   emitting lightwave signals to be modulated according to a data;
   forming dips at transitions between temporally consecutive groups of n symbols of the lightwave signals, n representing an integer equal to or greater than 3,
   wherein the dips are formed at each of (n−1) first transitions of the group,
   no dip is formed at the n-th transition on the lightwave signals,
   n consecutive transitions between symbols comprise at least (n−1) dips;
   receiving the lightwave signals;
   extracting frequency components characterized by the numerical value n from received lightwave signals; and
   monitoring the received lightwave signals by using the frequency components.

2. The monitoring method for an optical communication system according to claim 1, wherein the step of forming dips further comprises shaping n−2 symbols as pulses with a pulse period equal to a symbol period,
   shaping a rising edge of amplitude on a temporally following (n−1)-th symbol,
   keeping amplitude unaffected during a transition between the (n−1)-th symbol and a nth symbol, and
   shaping a falling edge of amplitude on the nth symbol.

3. The monitoring method for an optical communication system according to claim 1, wherein the frequency components include a signal component with one-nth frequency of the symbol rate in the lightwave signals.

4. The monitoring method for an optical communication system according to claim 1, wherein a numerical value of n is defined as a deferent value for each of the lightwave signals emitted by the optical communication system.

5. An optical communication system with monitor functions, comprising:
   an optical transmitter; containing
      a carver forming dips on groups of temporally consecutive n symbols, n representing an integer equal to or greater than 3,
      wherein (n−1) dips are formed, each dip is located at each of (n−1) first transitions between symbols,
      no dip is formed at the n-th transition between symbols; and
   an optical receiver; containing
      a coherent receiver receiving the lightwave signals,
      a processing unit extracting frequency components characterized by the numerical value of n from received lightwave signals and monitoring the received lightwave signals by using the frequency components.

6. The optical communication system with monitor functions according to claim 5, wherein the carver shapes n−2 symbols as pulses with a pulse period equal to a symbol period,
   shapes a rising edge of amplitude on a temporally following (n−1)-th symbol,
   keeps amplitude unaffected during a transition between the (n−1)-th symbol and a nth symbol, and
   shapes a falling edge of amplitude on the nth symbol.

7. The optical communication system with monitor functions according to claim 5, wherein the processing unit extracts the frequency components including a signal component with one-nth frequency of the symbol rate in the lightwave signals.

8. The optical communication system with monitor functions according to claim 5, wherein the lightwave signals are Polarization-Division-Multiplexed Quadrature-Pphase-Shift-Keying (PDM-QPSK) signals.

9. The optical communication system with monitor functions according to claim 5, wherein the carver comprises
- a clock outputting an electrical clock signal at a frequency proportional to the baud rate,
- a narrow pulse clock source generating a narrow pulse clock at the same frequency as the clock with duty cycle proportional to one-nth, and
- a modulator carving an amplitude of the input lightwave signal on the basis of outputs of the clock and the narrow pulse clock source.

10. The optical communication system with monitor functions according to claim 5, further comprising
- digital to analog converters generating electrical signals on the basis of data to be modulated and on the basis of the formed dips, and
- a modulator carving the amplitude of the input lightwave signal on the basis of the generated electrical signal.

* * * * *

UNITED STATES PATENT AND TRADEMARK OFFICE
CERTIFICATE OF CORRECTION

Page 1 of 1

PATENT NO. : 8,989,599 B2
APPLICATION NO. : 14/001226
DATED : March 24, 2015
INVENTOR(S) : Emmanuel Le Taillandier De Gabory, Kiyoshi Fukuchi and Manabu Arikawa It is certified that error appears in the above-identified patent and that said Letters Patent is hereby corrected as shown below:

In the Specification

Column 10, Line 50: Delete "(k$\leq$" and insert -- (k$\geq$ --

Signed and Sealed this
Twenty-fourth Day of November, 2015

Michelle K. Lee
*Director of the United States Patent and Trademark Office*